US009930270B2

(12) United States Patent
Soni et al.

(10) Patent No.: US 9,930,270 B2
(45) Date of Patent: Mar. 27, 2018

(54) METHODS AND APPARATUSES FOR CONTROLLING VIDEO CONTENT DISPLAYED TO A VIEWER

(71) Applicant: Microsoft Technology Licensing, LLC, Redmond, WA (US)

(72) Inventors: Shahil Soni, Espoo (FI); Esa Kankaanpää, Hyvinkää (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 79 days.

(21) Appl. No.: 14/883,952

(22) Filed: Oct. 15, 2015

(65) Prior Publication Data

US 2017/0111595 A1    Apr. 20, 2017

(51) Int. Cl.
*G09G 5/14* (2006.01)
*H04N 5/262* (2006.01)
*H04N 5/445* (2011.01)
*H04N 5/232* (2006.01)
*G06K 9/00* (2006.01)
(Continued)

(52) U.S. Cl.
CPC ....... *H04N 5/2628* (2013.01); *G06K 9/00718* (2013.01); *G06K 9/3233* (2013.01);
(Continued)

(58) Field of Classification Search
CPC ... G06F 3/012; G06F 3/0485; G06K 9/00718; G06K 9/62; H04N 1/387; H04N 21/21805; H04N 21/4307; H04N 21/4394; H04N 21/44008; H04N 21/4728; H04N 5/23238; H04N 5/2628; H04N 5/44591; G09G 5/14; H04L 65/4092; H04L 65/80
(Continued)

(56) References Cited

U.S. PATENT DOCUMENTS 5,844,599 A    12/1998    Hildin
6,577,333 B2    6/2003    Tai et al.
(Continued)

FOREIGN PATENT DOCUMENTS

CN      202455444 U      9/2012
WO      2013185238 A1    12/2013

OTHER PUBLICATIONS

Inoue et al, Effects of Video Expression in videoconferencing, 1999.*
(Continued)

*Primary Examiner* — Shan E Elahi

(57) ABSTRACT

A method and an apparatus for controlling video content displayed to a viewer are presented. The method includes receiving video stream of a video. Two or more areas of interest are identified in a segment of the video stream and a display priority for each area of interest is determined. The method includes facilitating display of concurrently occurring portions of the segment if the display priority for the each area of interest is equal and the areas of interest can be simultaneously presented in a single view on a display screen. The concurrently occurring portions are displayed in a split screen arrangement if the areas of interest cannot be simultaneously presented in the single view. The portions of the segment related to one or more areas of interest are displayed based on an order of the display priority if the display priority for the each area of interest is unequal.

20 Claims, 17 Drawing Sheets

(51) Int. Cl.
*H04N 7/15* (2006.01)
*H04L 29/06* (2006.01)
*H04N 1/387* (2006.01)
*H04N 21/218* (2011.01)
*H04N 21/43* (2011.01)
*H04N 21/439* (2011.01)
*H04N 21/44* (2011.01)
*H04N 21/4728* (2011.01)
*H04N 21/431* (2011.01)
*G06K 9/32* (2006.01)
*H04N 7/14* (2006.01)

(52) U.S. Cl.
CPC .......... *G09G 5/14* (2013.01); *H04L 65/4092* (2013.01); *H04L 65/80* (2013.01); *H04N 1/387* (2013.01); *H04N 5/23238* (2013.01); *H04N 5/44591* (2013.01); *H04N 7/147* (2013.01); *H04N 7/152* (2013.01); *H04N 21/21805* (2013.01); *H04N 21/4307* (2013.01); *H04N 21/4312* (2013.01); *H04N 21/4394* (2013.01); *H04N 21/44008* (2013.01); *H04N 21/4728* (2013.01)

(58) Field of Classification Search
USPC .......................................................... 348/36
See application file for complete search history.

(56) References Cited

U.S. PATENT DOCUMENTS

| | | | |
|---|---|---|---|
| 7,969,472 B2 | 6/2011 | Biegelsen et al. | |
| 8,248,448 B2 | 8/2012 | Feng et al. | |
| 8,274,544 B2 | 9/2012 | Kurtz et al. | |
| 8,289,363 B2 | 10/2012 | Buckler | |
| 8,355,041 B2 | 1/2013 | Chen et al. | |
| 8,358,328 B2 | 1/2013 | Friel et al. | |
| 8,390,667 B2 | 3/2013 | Mauchly et al. | |
| 8,587,634 B1* | 11/2013 | Baldino | H04N 7/15 348/14.08 |
| 8,773,499 B2 | 7/2014 | Watson et al. | |
| 8,842,161 B2 | 9/2014 | Feng et al. | |
| 2007/0260684 A1* | 11/2007 | Sharma | G06Q 10/109 709/204 |
| 2009/0037826 A1 | 2/2009 | Bennetts | |
| 2012/0069131 A1* | 3/2012 | Abelow | G06Q 10/067 348/14.01 |
| 2012/0069134 A1* | 3/2012 | Garcia, Jr. | H04M 3/568 348/14.08 |
| 2012/0320143 A1 | 12/2012 | Chu et al. | |
| 2015/0135238 A1* | 5/2015 | Wickenkamp | H04N 21/4122 725/80 |

OTHER PUBLICATIONS

Ranjan, et al., "Automatic Camera Control Using Unobtrusive Vision and Audio Tracking", In Proceedings of Conference on the Graphics Interface, May 31, 2010, 8 pages.

"International Search Report and Written Opinion Issued in PCT Application No. PCT/US2016/052379", dated November 9, 2016, 11 Pages.

"International Preliminary Report on Patentability Issued in PCT Application No. PCT/US2016/052379", dated Sep. 13, 2017, 7 Pages.

* cited by examiner

METHODS AND APPARATUSES FOR CONTROLLING VIDEO CONTENT DISPLAYED TO A VIEWER

TECHNICAL FIELD

The present application generally relates to video display mechanisms, and more particularly to methods and apparatuses for controlling video content displayed to a viewer.

BACKGROUND

Nowadays, applications facilitating capturing and sharing of video content are gaining widespread popularity on account of ubiquity of mobile devices equipped with digital cameras and increasing capacity of data sharing networks. In an example scenario, users involved in a meeting may use a video conferencing application to stream live video of the on-going meeting to a user wishing to participate in the meeting from a remote location, thereby involving the remote user in the meeting as if she were physically present for the meeting. In another example scenario, a video recording application may record a video of an event for subsequent streaming to another viewer on his/her electronic device.

In many such live streaming or recorded streaming applications, an image-capture viewpoint of the capturing device, such as for example a camera, is controlled by detecting a person who is speaking, and then focusing the camera in that direction. Such a manner of controlling camera viewpoint often causes distracting effect for the remote viewer as the image jumps awkwardly from person to person, which makes the conversation tiresome to follow. Moreover, the remote viewer is usually confined to look at the captured video through limited viewpoint defined by the electronic device used to consume the video, for example, a '16:9' aspect ratio screen of a mobile device.

It is desirable to provide a pleasant and comfortable viewing experience to a viewer of the video content. Further, it is advantageous to control the video display by framing the video footage in a manner that a default viewpoint composition is presented to the user. This way the viewer does not need to constantly adjust the viewpoint of the video stream in order to receive an optimal viewing experience.

The embodiments described below are not limited to implementations, which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, a method for controlling video display is presented. The method includes receiving a video stream of a video. The video is captured using an image-capture field of view of at least 180 degrees. The video stream includes a series of image frames. The method further includes identifying two or more areas of interest in a segment including at least one image frame from among the series of image frames of the video stream. The two or more areas of interest are identified based at least in part on one or more active objects detected in the segment. A display priority for each area of interest from among the two or more areas of interest is determined based on predefined rules. Further, the method includes determining whether the display priority for the each area of interest is equal. In response to determining the display priority for the each area of interest to be equal, the method includes determining whether the two or more areas of interest are capable of being simultaneously presented in a single view on a display screen, and, performing one of: facilitating display of concurrently occurring portions of the segment related to the two or more areas of interest in the single view on the display screen if the two or more areas of interest are capable of being simultaneously presented in the single view on the display screen; and facilitating display of the concurrently occurring portions of the segment related to the two or more areas of interest using a split screen arrangement on the display screen if the two or more areas of interest are not capable of being simultaneously presented in the single view on the display screen. Furthermore, in response to determining the display priority for the each area of interest to be unequal, the method facilitates displaying of portions of the segment related to one or more areas of interest from among the two or more areas of interest on the display screen based on an order of the display priority for the each area of interest. Further, the display on the display screen is transitioned based on a change detected in the display priority of at least one area of interest from among the two or more areas of interest. The transitioning of the display is performed using a predefined pace of display transition.

In an embodiment, an apparatus for controlling video display is presented. The apparatus includes at least one processor and at least one memory. The at least one memory includes computer program code. The at least one memory and the computer program code are configured to, with the at least one processor, cause the apparatus to at least receive a video stream of a video. The video is captured using an image-capture field of view of at least 180 degrees. The video stream includes a series of image frames. The apparatus is caused to identify two or more areas of interest in a segment including at least one image frame from among the series of image frames of the video stream. The two or more areas of interest are identified based at least in part on one or more active objects detected in the segment. A display priority for each area of interest from among the two or more areas of interest is determined based on predefined rules. Further, the apparatus is caused to determine whether the display priority for the each area of interest is equal. In response to determining the display priority for the each area of interest to be equal, the apparatus is caused to determine whether the two or more areas of interest are capable of being simultaneously presented in a single view on a display screen, and, perform one of: facilitating display of concurrently occurring portions of the segment related to the two or more areas of interest in the single view on the display screen if the two or more areas of interest are capable of being simultaneously presented in the single view on the display screen; and facilitating display of the concurrently occurring portions of the segment related to the two or more areas of interest using a split screen arrangement on the display screen if the two or more areas of interest are not capable of being simultaneously presented in the single view on the display screen. Furthermore, in response to determining the display priority for the each area of interest to be unequal, the apparatus is caused to facilitate displaying of portions of the segment related to one or more areas of interest from among the two or more areas of interest on the display screen based on an order of the display priority for the each area of interest. Further, the display on the display screen is transitioned based on a change detected in the display priority of at least one area of interest from among the two or more areas of interest. The transitioning of the display is performed using a predefined pace of display transition.

In an embodiment, a computer program product for facilitating display based on a display priority is presented. The computer program product includes at least one computer-readable storage medium. The computer-readable storage medium includes a set of instructions, which, when executed by one or more processors, cause an apparatus to at least receive a video stream of a video. The video is captured using an image-capture field of view of at least 180 degrees. The video stream includes a series of image frames. The apparatus is caused to identify two or more areas of interest in a segment including at least one image frame from among the series of image frames of the video stream. The two or more areas of interest are identified based at least in part on one or more active objects detected in the segment. A display priority for each area of interest from among the two or more areas of interest is determined based on predefined rules. Further, the apparatus determines whether the display priority for the each area of interest is equal. In response to determining the display priority for the each area of interest to be equal, the apparatus determines whether the two or more areas of interest are capable of being simultaneously presented in a single view on a display screen, and, perform one of: facilitating display of concurrently occurring portions of the segment related to the two or more areas of interest in the single view on the display screen if the two or more areas of interest are capable of being simultaneously presented in the single view on the display screen; and facilitating display of the concurrently occurring portions of the segment related to the two or more areas of interest using a split screen arrangement on the display screen if the two or more areas of interest are not capable of being simultaneously presented in the single view on the display screen. Furthermore, in response to determining the display priority for the each area of interest to be unequal, the apparatus is caused to facilitate displaying of portions of the segment related to one or more areas of interest from among the two or more areas of interest on the display screen based on an order of the display priority for the each area of interest. Further, the display on the display screen is transitioned based on a change detected in the display priority of at least one area of interest from among the two or more areas of interest. The transitioning of the display is performed using a predefined pace of display transition Many of the attendant features will be more readily appreciated, as the same becomes better understood by reference to the following detailed description considered in connection with the accompanying drawings.

DESCRIPTION OF THE DRAWINGS

The present description will be better understood from the following detailed description read in light of the following accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
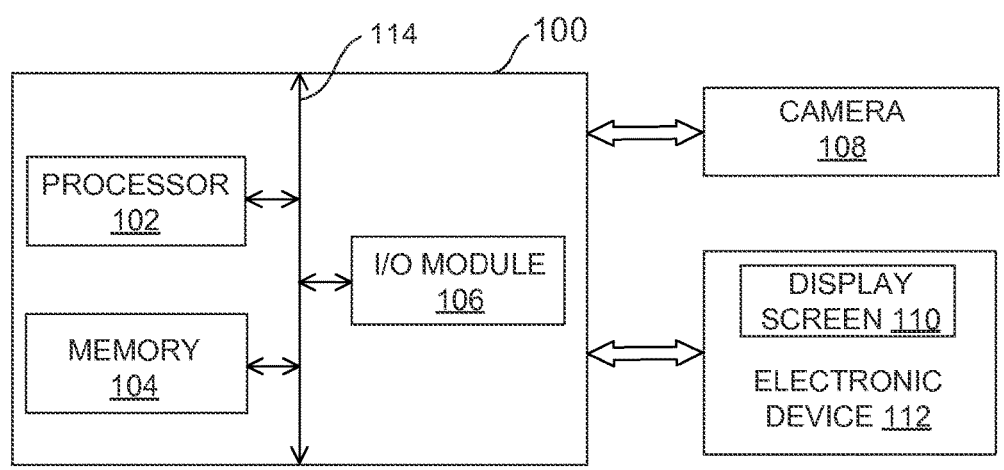
FIG. 1 is a block diagram showing an apparatus, in accordance with an example embodiment.

FIG. 1 is a block diagram showing an apparatus 100, in accordance with an example embodiment. In at least one example embodiment, the apparatus 100 includes a processor for example, a processor 102, and at least one memory for example, a memory 104. The memory 104 is capable of storing machine executable instructions. Further, the processor 102 is capable of executing the stored machine executable instructions. The processor 102 may be embodied in a number of different ways. In an embodiment, the processor 102 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In at least one example embodiment, the processor 102 utilizes computer program code to cause the apparatus 100 to perform one or more actions.

The memory 104 may be embodied as one or more volatile memory devices, one or more non-volatile memory devices or a combination of one or more volatile memory devices and non-volatile memory devices. For example, the memory 104 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

In an embodiment, the apparatus 100 includes an input/output (I/O) module 106 configured to enable the apparatus 100 to receive input and provide output. For example, the I/O module 106 may receive an input of a video stream corresponding to a video captured by one or more cameras and generate an output stream configured to customize display of the video stream on one or more remote electronic devices. To that effect, the I/O module 106 may be in operative communication with at least one camera, such as a camera 108. In an embodiment, the camera 108 may be associated with an image-capture field of view of at least 180 degrees in at least one of a horizontal direction and a vertical direction. For example, the camera 108 may be a '360 camera' associated with 360×360 spherical image-capture field of view. Alternatively, the camera 108 may be associated with an image-capture field of view of 180 degrees or less than 180 degrees, in which case, the I/O module 106 may be in operative communication with one or more cameras, such as the camera 108, such that a combined image-capture field of view of the one or more cameras is at least 180 degrees. The camera 108 may include hardware and/or software necessary for capturing a series of image frames to generate a video stream. For example, the camera 108 may include hardware, such as a lens and/or other optical component(s) such as one or more image sensors. Examples of an image sensor may include, but are not limited to, a complementary metal-oxide semiconductor (CMOS) image sensor, a charge-coupled device (CCD) image sensor, a backside illumination sensor (BSI) and the like. Alternatively, the camera 108 may include only the hardware for capturing video, while a memory device of the apparatus 100 stores instructions for execution by the processor 102 in the form of software for generating a video stream from the captured video. In an example embodiment, the camera 108 may further include a processing element such as a co-processor that assists the processor 102 in processing image frame data and an encoder and/or decoder for compressing and/or decompressing image frame data. The encoder and/or decoder may encode and/or decode according to a standard format, for example, a Joint Photographic Experts Group (JPEG) standard format.

In FIG. 1, the camera 108 is depicted to be in operative communication with the apparatus 100, however in some embodiments, the camera 108 may be included within the apparatus 100. In some example embodiments, the camera 108 may be included within an electronic device housing the apparatus 100. Examples of the electronic device may include, but are not limited to, a camera device, a mobile phone, a laptop computer, a tablet computer, a media player, a video recorder, a video conferencing system, a wearable device equipped with image/video capture capabilities, and the like. Alternatively, in some embodiments, the camera 108 may be disposed external to the electronic device and may be operatively coupled to the apparatus 100.

The I/O module 106 is further configured to be in operative communication with one or more user interfaces (UIs) of remote electronic devices, such as a display screen 110 of a remote electronic device 112. Examples of the remote electronic device 112 may include, but are not limited to, a mobile phone, a laptop computer, a tablet computer, a media player, a wearable device equipped with image/video display capabilities, and the like. Examples of the display screen 110 may include, but are not limited to, a light emitting diode display screen, a thin-film transistor (TFT) display screen, a liquid crystal display screen, an active-matrix organic light-emitting diode (AMOLED) display screen and the like.

In at least one example embodiment, the various components of the apparatus 100, such as the processor 102, the memory 104 and the I/O module 106 may communicate with each other via a centralized circuit system 114. The centralized circuit system 114 may be various devices configured to, among other things, provide or enable communication between the components of the apparatus 100. In certain embodiments, the centralized circuit system 114 may be a central printed circuit board (PCB) such as a motherboard, a main board, a system board, or a logic board. The centralized circuit system 114 may also, or alternatively, include other printed circuit assemblies (PCAs) or communication channel media.

It is noted that the apparatus 100 may include fewer or more components than those depicted in FIG. 1. In an embodiment, one or more components of the apparatus 100 may be implemented as a set of software layers on top of existing hardware systems. In an exemplary scenario, the apparatus 100 may be any machine capable of executing a set of instructions (sequential and/or otherwise) so as to control a display of captured video to create a comfortable and natural viewing experience for a viewer.

In at least one example embodiment, the apparatus 100 is caused to receive a video stream of a video captured using an image-capture field of view of at least 180 degrees. More specifically, the I/O module 106 of the apparatus 100 may receive the video stream of the video from one or more cameras, such as the camera 108, that the I/O module 106 is operatively coupled with. In an embodiment, the video stream may be received from a single camera, such as a '360 camera', associated with an image-capture field of view of 360 degrees in the horizontal direction and the vertical direction. Alternatively, one or more cameras, such as for example cameras in a stereo camera setup, may capture a video of a scene from multiple viewpoints to generate a video stream associated with an image-capture field of view of at least 180 degrees. The term 'image capture field of view' as used herein refers to an angular extent of observable scene that can be viewed through the lens assembly of the camera. Accordingly, the video may be captured using multiple cameras such that the combined image-capture field of view is at least 180 degrees, or, the video may be captured using a single camera, such as the '360 camera' associated with an image-capture field of view of 360 degrees. In an embodiment, the camera 108 may be associated with one or more directional microphones, with each directional microphone configured to capture sound (i.e. audio) emanating from at least one direction. In addition to capturing of sound, the directional microphones may further aid in identifying source(s) of sound (for example, a person addressing a group of people and the like) in the video.

The processor 102 of the apparatus 100 may be configured to receive the video stream from the I/O module 106. In at least one example embodiment, the received video stream includes a series of image frames. The processor 102, in conjunction with the memory 104, may be configured to control a display of the received video stream such that a comfortable and a pleasant viewing experience is provided to a viewer. To that effect, the processor 102 may be configured to analyze segments of image frames within the series of image frames corresponding to the video stream and control display of individual portions within the segment such that an improved viewing experience is provided to the viewer. The term 'segment' as used herein refers to a collection of image frames. In some embodiments, where the series of image frames includes a large number of image frames, a segment may be chosen by the processor 102 to include multiple image frames (for example, a large number of image frames related to a particular scene), whereas in some embodiments, where the series of image frames includes a small number of image frames, a segment may be chosen by the processor 102 to include only few image frames (for example, image frames related to a particular action or a movement). It is noted that the processor 102 may choose segment sizes based on various criteria such as a quality of display to be afforded to a viewer, a number of scenes involved, and a type of video application such as a live streaming or a recording streaming and the like. Accordingly, in some embodiments, the segment may include all the image frames corresponding to the video stream, whereas in some embodiments, each segment may include only one image frame corresponding to the video stream.

In at least one example embodiment, the processor 102 is configured to detect one or more active objects in a segment. The term 'active object' as used herein refers to an entity associated with movement or sound. In an illustrative example, if two individuals are engaged in a conversation (i.e. associated with sound as captured by a directional microphone) then each individual may be identified as an active object by the processor 102. Similarly, if the segment includes a moving vehicle, then the vehicle may be identified as an active object (since the vehicle is associated with movement or action). In yet another illustrative example, if the segment captures a scene of an animal running away from a predator, then both the animal and its predator may be detected as active objects by the processor 102. In an embodiment, the processor 102 may utilize any of face detection, gaze detection, sound detection, motion detection, thermal detection, whiteboard detection and background scene detection to detect the one or more active objects in the segment.

In at least one example embodiment, the processor 102 is configured to identify two or more areas of interest in the segment based at least in part on the one or more active objects in the segment. The term 'area of interest' as used herein may refer to a specific portion of the segment or the video stream that a viewer may be interested in viewing, or in other words, may be of interest to a viewer of the video stream. For example, if the segment includes three people involved in a discussion, then a viewer may be interested in viewing the person who is talking as opposed to a person who is presently not involved in the discussion. In at least some embodiments, the processor 102 is configured to identify the areas of interest based on detected active objects in the segment. However, in some embodiments, the processor 102 may be configured to identify areas of interest in addition to those identified based on the active objects in the scene. For example, the processor 102 may employ whiteboard detection to identify presence of a whiteboard in the scene. If a person (i.e. an active object) is writing on the whiteboard, then the viewer may be interested in viewing what is written on the whiteboard in addition to what the person is speaking while writing on the whiteboard. Accordingly, the processor 102 may identify an area of interest including both the whiteboard as well as the person writing on the whiteboard. In another illustrative example, if segment relates to individuals posing for the camera in a scenic environment, then the processor 102 utilizing background scene detection may identify the background area as a potential area of interest to a viewer in addition to the people posing for the camera.

In at least one example embodiment, the processor 102 is configured to determine a display priority for each identified area of interest based on predefined rules. In an example embodiment, the memory 104 may be configured to store a plurality of predefined rules for assigning the display priority to each area of interest based on an involvement of at least one of sound, motion (or action), object posture and change of scene in the each area of interest within the segment. For example, if multiple areas of interest are identified in a segment, then the area of interest associated with sound (for example, a sound of an individual speaking to the camera as detected by a directional microphone) may be assigned higher display priority as compared to an area of interest associated with an action (for example, some person walking in the background). In another example scenario, an area of interest including active objects not facing the camera (i.e. posture not directed towards the camera) may be assigned lower display priority than an area of interest where the active objects are facing the camera. In an illustrative example, for a scene involving a number of people, the predefined rules may suggest assigning a highest priority to an area of interest including at least one individual speaking to a camera, followed by an area of interest including people engaged in a conversation, and then an area of interest associated with action. If the areas of interest in the scene are not associated with individuals either speaking to the camera or engaged in conversation or associated with action, then the predefined rules may suggest displaying a wider zoom of people and the overall scene to a viewer.

In at least one embodiment, the memory 104 is configured to store separate set of rules for scenarios involving display of the video stream to a viewer as a live stream or as a recorded video stream. For example, in cases where the video stream is to be displayed to the viewer as a live stream, which is generally the case when the video is captured in an indoor environment, rules may be configured to assign higher display priority to areas of interest associated with sound, so as to capture people talking to the camera or individuals engaged in a discussion in a meeting environment, and the like. Alternatively, in cases where the video stream is to be displayed to the viewer as a recorded stream, which is generally the case when the video is captured in an outdoor environment where the ambient sound is higher, rules may be configured to assign lower display priority to areas of interest associated with sound. Instead, areas of interest associated with movement or action may be assigned higher display priority in such cases. It is understood that examples provided herein are for illustrative purposes and indeed the memory 104 may store rules for various scenarios, such as scenarios involving, video stream to be displayed as a live stream or a recorded stream, whether the camera is static or moving and the like. Further, it is noted that, in some embodiments, the display priority may be assigned as a numerical value (for example, a value on a scale of 1 to 5, and the like) or as a rank (for example, 'first', 'second', 'third' and so on and so forth) based on the predefined rules. It is understood that an assignment of display priority may not be limited to the illustrative examples provided herein.

In at least one embodiment, upon assigning a display priority to the each area of interest, the processor 102 is configured to determine whether the display priority for the each area of interest is equal. More specifically, the processor 102 may be configured to compare the display priority assigned to each area of interest within the segment and determine whether the display priorities are equal or not. In at least one example embodiment, if the processor 102 determines that the display priorities of the identified areas of interest are equal, then the processor 102 may be configured to determine if the identified areas of interest are capable of being simultaneously presented in a single view on a display screen of an electronic device associated with a viewer or not.

In an embodiment, the processor 102 is configured to compute distances from each area of interest to remaining areas of interest from among the two or more areas of interest. For example, if the processor 102 identifies two areas of interest, then a distance between active objects within the two areas of interest may be computed to determine if both areas of interest can be accommodated within a single view on the display screen. In an embodiment, the processor 102 may be configured to compare the computed distances with a predetermined distance measure. In an embodiment, the predetermined distance measure is computed based at least in part on an aspect ratio of the display screen configured to display the video stream. For example, the processor 102 may define the 'single view' of the display screen based on a '16:9' or '4:3' aspect ratio of the electronic device associated with a viewer. Based on the aspect ratio of the viewer's electronic device, the processor 102 may compute a maximum permissible distance between active objects and/or areas of interest as the predetermined distance measure for displaying the active objects and/or the areas of interest within a single view of the display screen. Accordingly, if the computed distances between the areas of interest are less than or equal to the predetermined distance measure, then the processor 102 may be configured to determine that the two or more areas of interest are capable of being simultaneously presented in the single view on the display screen. However, the processor 102 may determine that the two or more areas of interest are not capable of being simultaneously presented in the single view on the display screen if the computed distances are greater than the predetermined distance measure.

In at least one example embodiment, the processor 102 may be configured to determine whether the two or more areas of interest are capable of being simultaneously presented in the single view on the display screen based on a number of active objects associated with the two or more areas of interest. The determination of whether the two or more areas of interest are capable of being simultaneously presented in the single view on the display screen based on a number of active objects is explained later in detail with reference to FIG. 7.

In at least one example embodiment, if it is determined that the two or more areas of interest are capable of being simultaneously presented in the single view on the display screen, then the processor 102 may be configured to facilitate display of concurrently occurring portions of the segment related to the two or more areas of interest in the single view on the display screen. Alternatively, if it is determined that the two or more areas of interest are not capable of being simultaneously presented in the single view on the display screen, then the processor 102 may be configured to facilitate display of the concurrently occurring portions of the segment related to the two or more areas of interest using a split screen arrangement on the display screen. The term 'concurrently occurring portions' as used herein implies that scenes related to the areas of interests occurring at the same instances of time are either displayed in a single view or as a split screen arrangement on the display screen. An example representation of a scenario for illustrating a controlling of display for identified areas of interest in a segment of a video stream is explained with reference to FIGS. 2A to 2E.

Figure 2A:
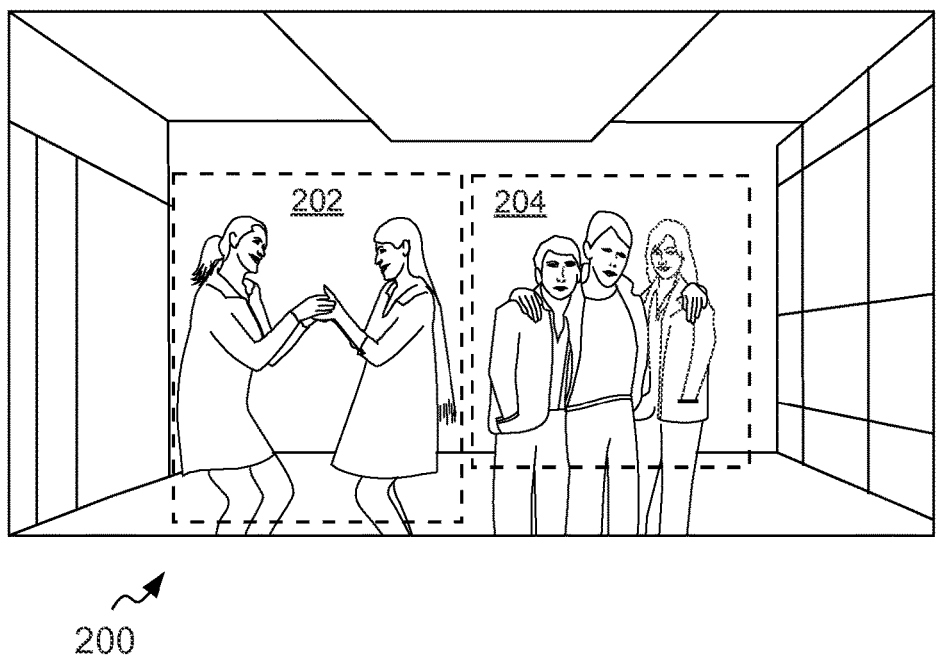
FIGS. 2A-2G show an example representation of a scenario for illustrating a controlling of display for identified areas of interest in a segment of a video stream, in accordance with an example embodiment.
Figure 2B:
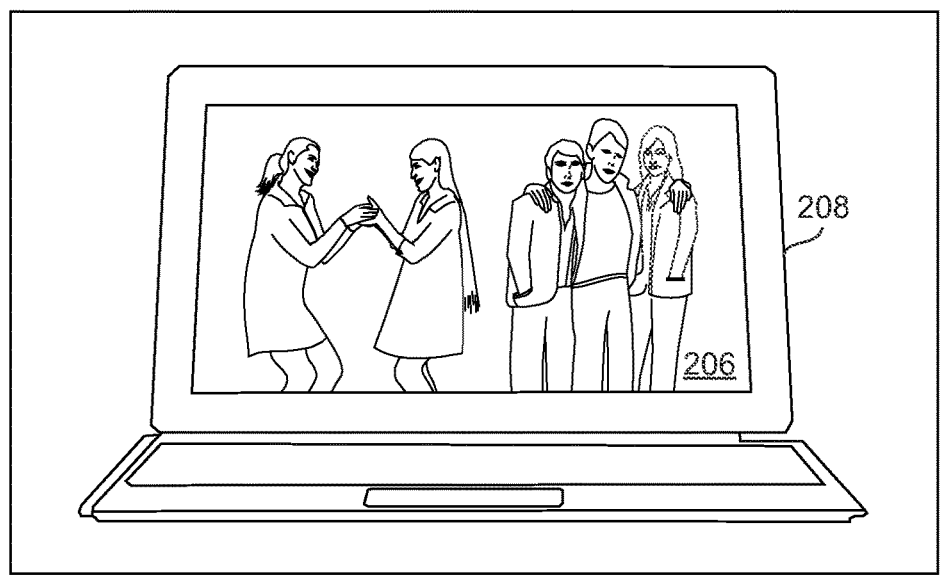

FIG. 2A is a diagram illustrating an example representation of a segment 200 of a video stream, in accordance with an example embodiment. It is understood that the segment 200 is depicted herein to be an image frame from among a series of image frames corresponding to a video stream for illustration purposes only. The segment 200 corresponds to a scene of a social event captured at a particular time instant. The scene may be captured by one or more cameras configuring an image-capture field of view of at least 180 degrees as explained with reference to FIG. 1. The processor 102 of the apparatus 100 of FIG. 1 may use face detection, gaze detection, posture detection, sound detection and the like, to detect active objects in the segment 200. Further, the processor 102 may be configured to identify areas of interest based on the detected active objects. In an example scenario, the processor 102 may identify two areas of interest, such as an area of interest 202 and an area of interest 204, in the segment 200. As can be seen in FIG. 2A, each of the areas of interest 202 and 204 include active objects. The processor 102 may further be configured to assign display priority to each area of interest. In an example scenario, the processor 102 may be configured to assign equal display priority to the areas of interest 202 and 204. Upon determining that display priority for the two areas of interest are equal, the processor 102 may be configured to determine if the two areas of interest are capable of being simultaneously presented in a single view on a display screen of an electronic device of a viewer of the video stream. If the processor 102 determines that the two areas of interest are capable of being simultaneously presented in a single view on the display screen, then the processor 102 is configured to facilitate display, or in other words provide a displayable video stream, to the electronic device of the viewer such that the two areas of interest are displayed in a single view as depicted in FIG. 2B. More specifically, FIG. 2B is a diagram illustrating an example representation of a display screen 206 of an electronic device 208 of a viewer displaying the two areas of interest, i.e. the areas 202 and 204, in a single view of the display screen 206.

Figure 2C:
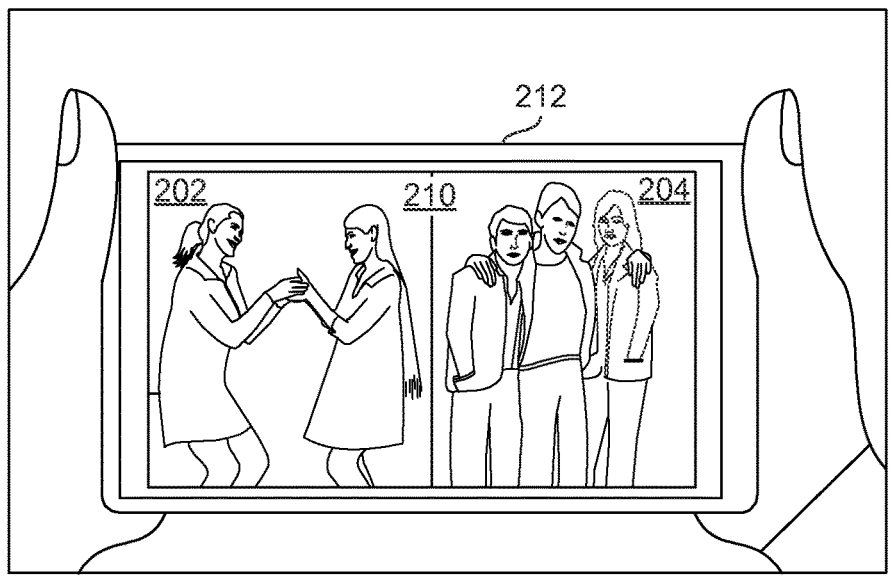

If the processor 102 determines that the areas of interest are not capable of being simultaneously presented in a single view on the display screen, then the processor 102 is configured to facilitate display, or in other words provide a displayable video stream, to an electronic device of the viewer such that the two areas of interest are displayed as a split screen arrangement as depicted in FIG. 2C. More specifically, FIG. 2C is a diagram illustrating an example representation of a display screen 210 of an electronic device 212 of the viewer showing a split screen arrangement for displaying two areas of interest, i.e. the areas 202 and 204 to the viewer. It is understood that if the processor 102 identified three or more areas of interest, then the available display space on the display screen 210 may be divided in three or more parts to display concurrently occurring portions of the video stream related to the three or more areas of interest.

Figure 2D:
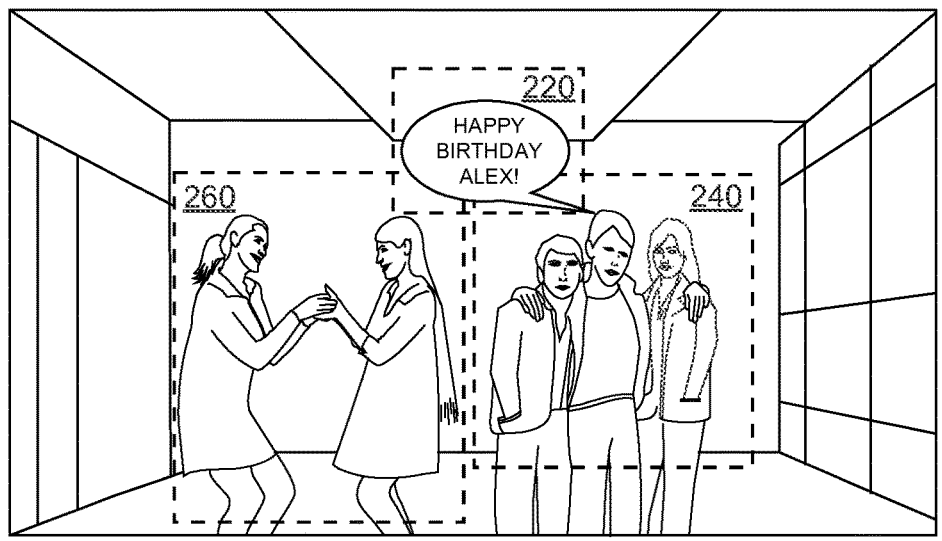
Figure 2E:
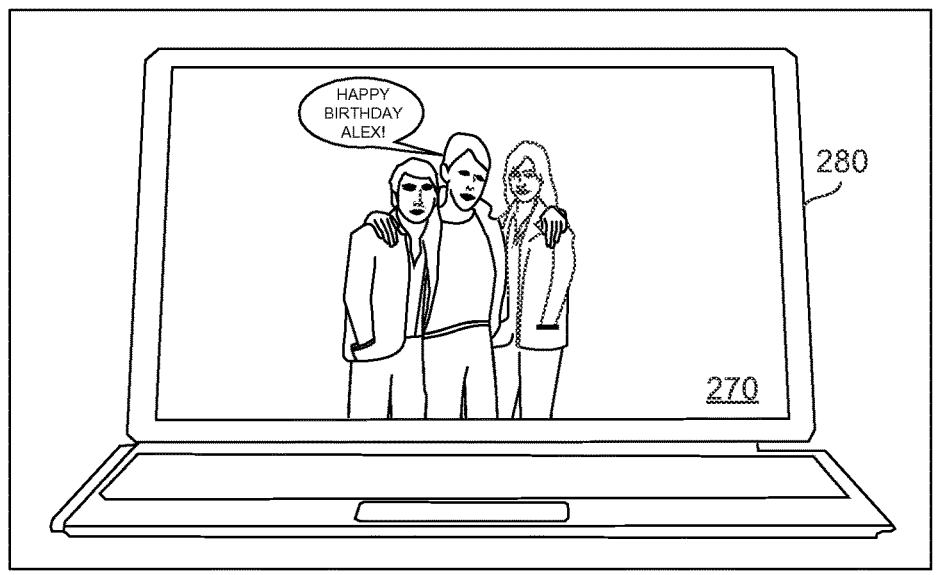

Referring now to FIG. 1, if the processor 102 determines that the display priority for the each area of interest is unequal, then the processor 102 may further be configured to facilitate display of portions of the segment related to one or more areas of interest on the display screen based on an order of the display priority for the each area of interest. For example, consider the segment 200 of FIG. 2A including an individual speaking to the camera. Such a scene is depicted in FIG. 2D. In such a scenario, the processor 102 identifies three areas of interest 220, 240 and 260 as depicted in FIG. 2D. The processor 102 may further be configured to determine display priorities for the three areas of interest 220, 240 and 260. In an example scenario, a highest display priority may be assigned to the area of interest 220. In an embodiment, upon assigning the display priorities to the areas of interest 220, 240 and 260 and determining the display priorities to be unequal, the processor 102 is configured to facilitate display, i.e. provide a displayable video stream, of the area of interest with the highest priority, i.e. the area 220 on a display screen as depicted in FIG. 2E. It is noted that in some example embodiments, more than one area of interest may be associated with equally high display priorities and the remaining areas of interest may be associated with lower display priorities. In such a case, the processor 102 may display the areas of interest with the high display priorities to a viewer in a single view or one after another. For example, concurrently occurring portions of the areas of interest with the high display priorities may be displayed to the viewer in a single view, or, a display of one area of interest with relatively higher display priority may be followed by another area of interest with relatively lower display priority.

Figure 2F:
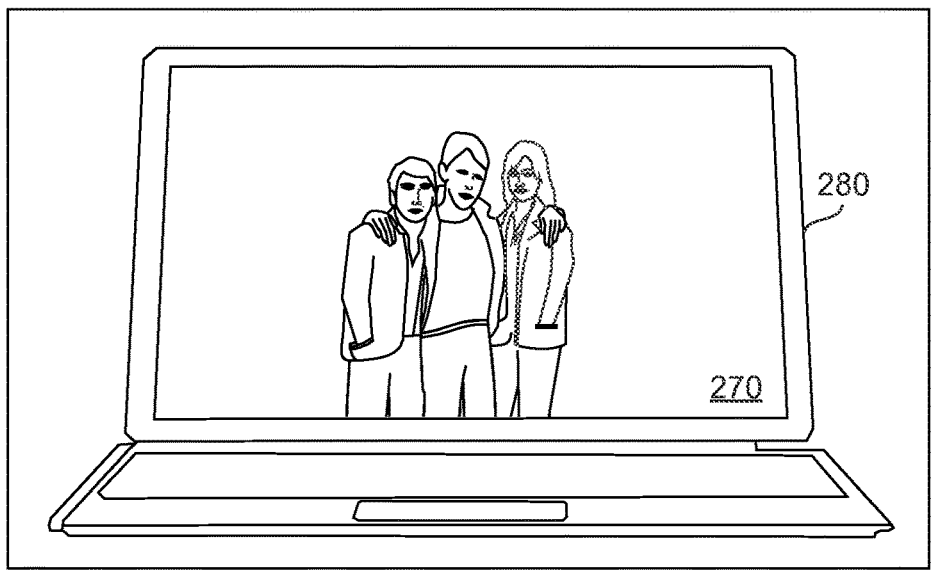
Figure 2G:
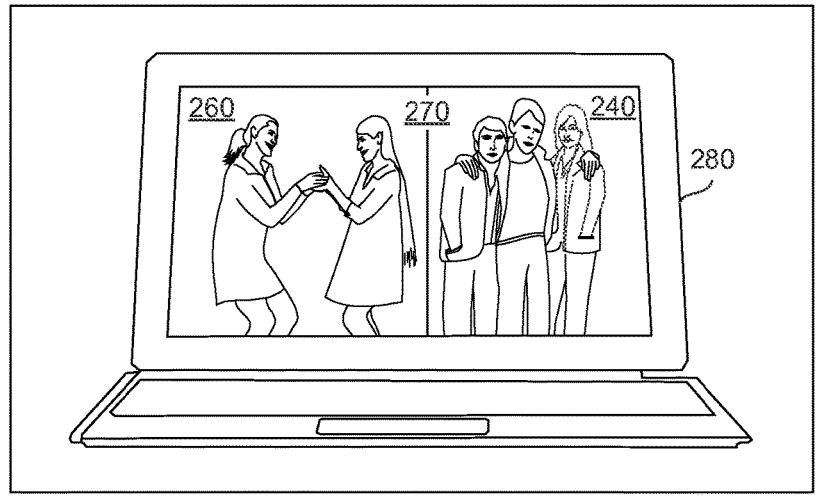

In an embodiment, the processor 102 is configured to display the area of interest with the highest display priority (or one or more areas of interest with high display priority) till a change in the display priority is detected. For example, the processor 102 may detect that the person has stopped speaking to the camera (as exemplarily depicted in FIG. 2F). Upon detecting that the person has stopped speaking to the camera, the processor 102 may determine the display priorities of the areas of interest again. In an illustrative example, the processor 102 may once again identify the areas of interest 240 and 260. Moreover, the processor 102 may determine that the area of interest 240 now has equal display priority as that of area of interest 260. More specifically, the processor 102 may determine that the area of interest 220 with previously high display priority is now associated with a lower display priority as the person has stopped speaking to the camera. Upon determining the display priority of the areas of interest 240 and 260 to be equal, the processor 102 may be configured to display the areas of interest 240 and 260 as a split screen arrangement as depicted in FIG. 2G.

As explained with reference to FIGS. 2E, 2F and 2G, the display screen 270 of an electronic device 280 may be controlled to display identified areas of interests based on an order of display priority to a viewer, such that one or more areas of interest with high display priorities are always displayed to a viewer. Upon detecting a change in the display priority (for example, upon detecting that an area of interest with currently high display priority is now associated with a lower display priority), the display on the display screen 270 is transitioned to another area of interest with the higher display priority. It is noted that though the illustrative examples explained herein suggest transitioning of the display from an area of interest associated with a lower display priority to an area of interest associated with a higher display priority upon detecting a change in the display priority, in some example embodiments, the display may be transitioned from an area of interest associated with a higher display priority to an area of interest associated with a lower display priority.

In at least one example embodiment, a transition from the area of interest with the lower display priority to the area of interest with the higher display priority may be configured in such a manner that the image frame being displayed does not jump awkwardly from one scene to another and instead affords a viewer of the display screen, a gradual display experience from the one area of interest to the another area of interest. In an embodiment, the transitioning of the display may be controlled as per a predefined pace of display transition. In at least one embodiment, the processor 102 may be configured to introduce one or more intermittent field frames in-between the image frames corresponding to the two areas of interest such that the transition of the display on the display screen 270 is smooth and provides a comfortable and pleasant viewing experience to the viewer. In an embodiment, the processor 102 may utilize additional information captured in the video being associated with an image-capture field of view of 180 degrees to introduce appropriate intermittent field frames so that a gradual camera panning or tilting effect is provided to the viewer for enabling a smooth transition from one area of interest to another. In an embodiment, the predefined pace of display transition is configured to be adjusted to a rate of motion activity or sound activity associated with the one or more active objects within the two or more areas of interest. For example, consider a segment including areas of interest where the rate of motion activity or sound activity is high, such as for example when there is a debate between two individuals or if two cars are speeding. In such a case, the predefined pace of display transition may be adjusted such that fewer number of field frames may be introduced in-between the image frames corresponding to the areas of interest, or in other words a time-gap between the two image frames showing areas of interest may be shortened. Thereby, twin objectives of smoothening the display transition as well as maintaining a momentum of captured activity is achieved. Another example representation for illustrating a controlling of display for identified areas of interest in a segment of a video stream is explained with reference to FIGS. 3A to 3D.

Figure 3A:
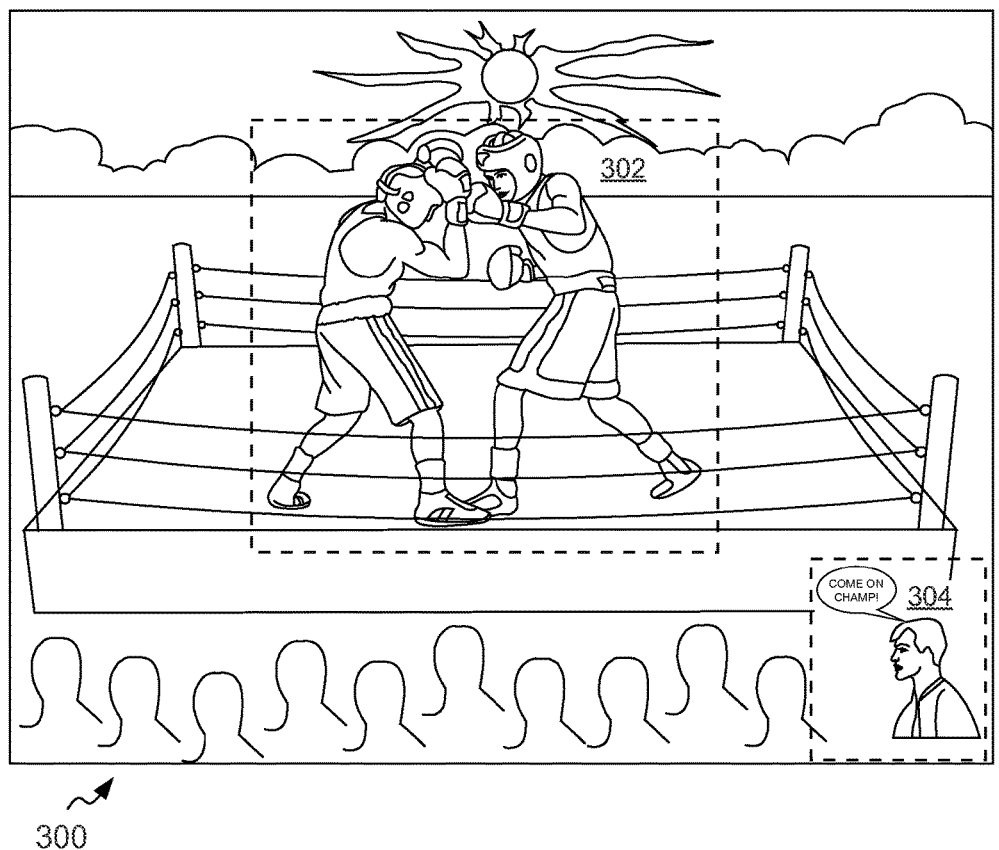
FIGS. 3A-3D show an example representation of another scenario for illustrating a controlling of display for identified areas of interest in a segment of a video stream, in accordance with an example embodiment.

FIG. 3A is a diagram illustrating an example representation of a segment 300 of a video stream, in accordance with an example embodiment. The segment 300 includes a series of image frames corresponding to an outdoor scene of a boxing match captured by one or more cameras configuring an image-capture field of view of at least 180 degrees.

Figure 3B:
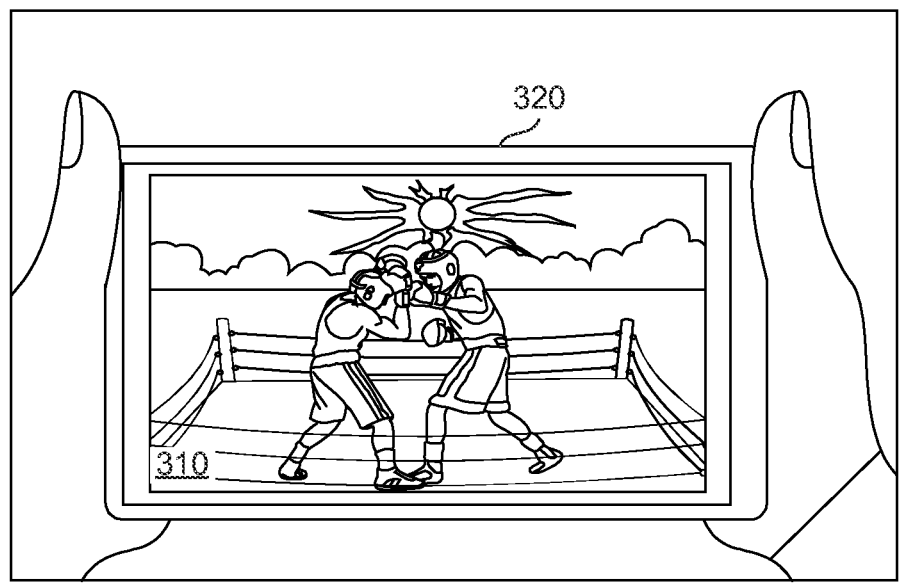

In an example scenario, the segment 300 may be a part of video stream to be recorded for subsequent transmission and display to a remote viewer. As explained with reference to FIG. 1, the memory 104 may be configured to store a separate set of rules for each of live streaming and recorded streaming scenarios. Further, in some embodiments, areas of interest associated with action or motion may be assigned a higher display priority than areas of interest associated with sound/posture in an outdoor environment. Accordingly, the processor 102 may first use face detection, gaze detection, sound detection, posture detection and the like, to detect active objects in the segment 300. Thereafter, the processor 102 may be configured to identify areas of interest based on the detected active objects and determine display priorities associated with the identified areas of interest. In an embodiment, the processor 102 may identify the area of interest 302 and assign high display priority to the area of interest 302. The processor 102 may further be configured to display the portion of the segment related to the area of interest 302 on a display screen 310 of an electronic device 320 of a remote viewer as depicted in FIG. 3B.

Figure 3C:
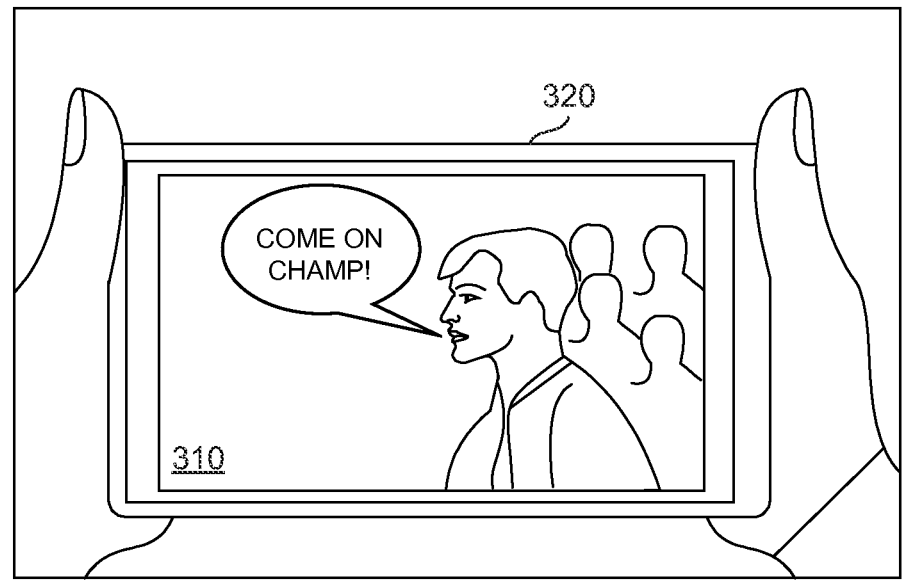

In an illustrative example, the segment 300 may further include a portion, where an individual in the audience vocally cheers a boxer participating in the boxing match as exemplarily depicted in FIG. 3A. Such vocal cheering by the individual in the audience may be captured by, for example, a directional microphone associated with a camera capturing the segment 300. Upon detection of a new sound in the segment, the processor 102 may be configured to determine if there is a change in display priority. In an illustrative example, a change in scene (also referred to herein as an 'interruption') may be associated with higher display priority as per the predefined rules stored in the memory 104. Accordingly, the processor 102 may determine a change in display priority on account of new sound detection and may initiate identification of areas of interest again. In an embodiment, the processor 102 may determine two areas of interest 302 and 304. The processor 102 may further determine display priorities for the two areas of interest and check if the display priorities are equal or not. Upon determining that the display priorities for the two areas of interest are unequal, the processor 102 may be configured to facilitate display, i.e. provide a displayable video stream, of the area of interest with the higher display priority, i.e. the area 304 on the display screen 310 of the electronic device 320 as depicted in FIG. 3C. To that effect, the processor 102 may transition the display from a viewpoint displayed on the display screen 310 as depicted in FIG. 3B to a viewpoint displayed on the display screen 310 of the electronic device 320 as depicted in FIG. 3C.

Figure 3D:
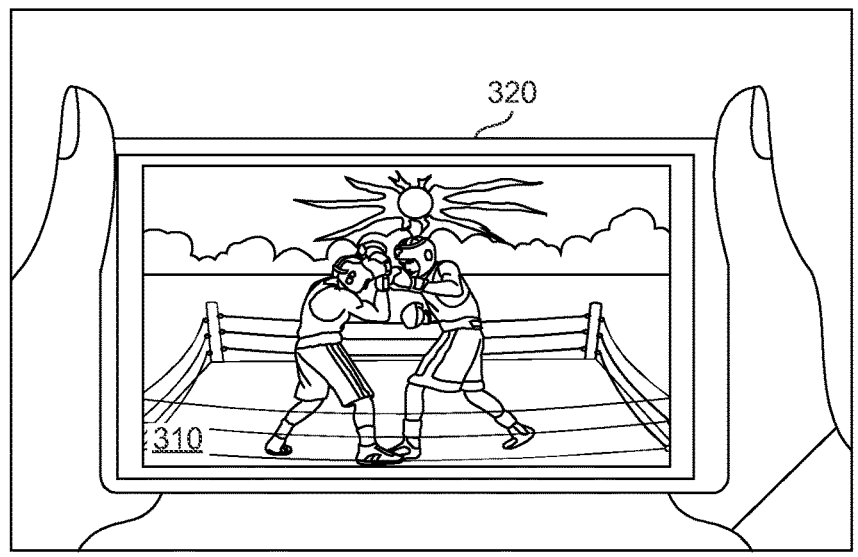

Further, upon detecting that the individual has stopped cheering the boxer, the processor 102 may be configured to revert the display to the portion of the segment related to the area 302 as depicted in FIG. 3D, to provide a continued viewing experience of the boxing match to the viewer. It is noted the viewing experience of the viewer may be continued from the image frame depicted in FIG. 3B before the interruption by the image frame as depicted in FIG. 3C so that the viewer does not miss on any portion of the action. Moreover, the processor 102 may be configured to control a transitioning of the display from one area of interest to another as per the predefined pace of display transition so that a smooth viewing experience is provided to the viewer. Another example representation for illustrating controlling of video display provided to a viewer is explained with reference to FIGS. 4A and 4B.

Figure 4A:
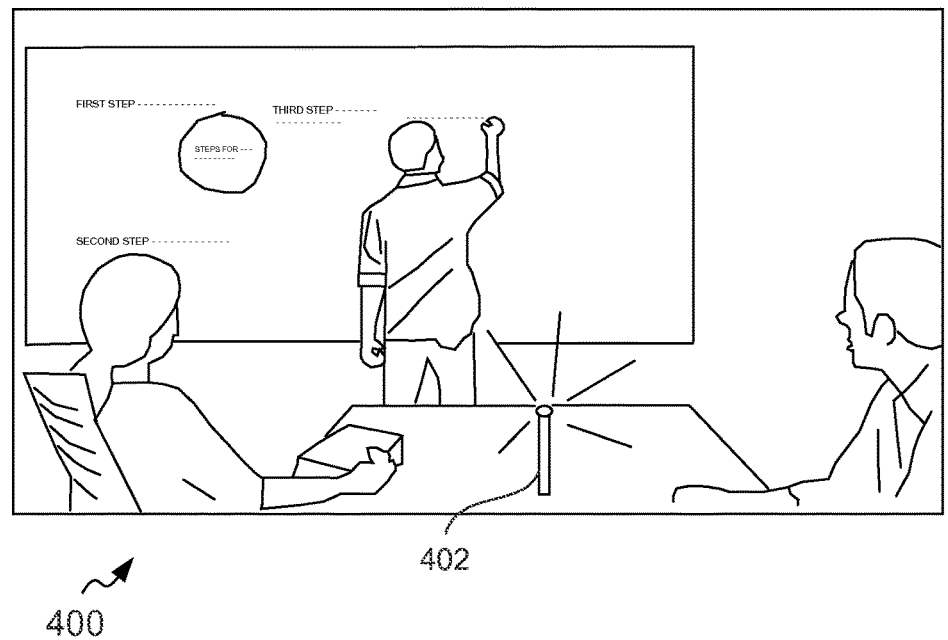
FIGS. 4A-4B show an example representation of yet another scenario for illustrating a controlling of display for identified areas of interest in a segment of a video stream, in accordance with an example embodiment.
Figure 4B:
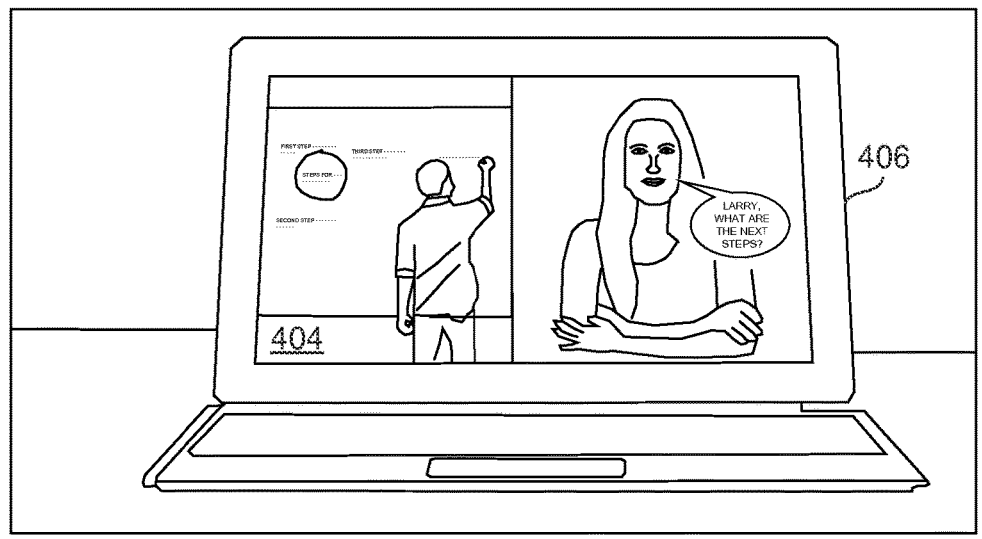

FIG. 4A is a diagram illustrating an example representation of segment 400 of a video stream, in accordance with an example embodiment. The segment 400 includes a series of image frames corresponding to a meeting scene captured by a '360 camera' 402 associated with an image-capture field of view of 360 degrees. The '360 camera' 402 is hereinafter referred to as the camera 402. The meeting scene in the segment 400 is depicted to show an individual writing on a whiteboard and two more individuals viewing the text being written on the whiteboard. One of the individuals may comment while the other individual is writing on the whiteboard. The processor 102 receiving the segment 400 as a part of the video stream may detect active objects as well as comprehend the flow of the conservation and identify areas of interest to be the ones involving the individual writing on the whiteboard as well as the individual commenting in relation to what is being written on the whiteboard. In such a scenario, since the two activities are closely related, the processor 102 may be configured to assign equal display priority to the two areas of interest. Further, the processor 102 may check if the two areas of interest are capable of being simultaneously presented in a single view on the display screen. To that effect, the processor 102 may compute a distance between the active objects and/or areas of interest and compare the computed distance to a predetermined distance measure to determine if the two areas of interest are capable of being simultaneously presented in a single view on a display screen of a viewer's device, as explained with reference to FIG. 1. Upon determining that the two areas of interest cannot be simultaneously presented in a single view on the display screen, the processor 102 may facilitate display of concurrently occurring portions of the two areas of interest within the segment as a split screen arrangement on a display screen 404 of an electronic device 406 as depicted in FIG. 4B. Thus, the video displayed to the user is controlled to show a person writing and the other person speaking at the same time.

As explained with reference to above, the processor 102 of the apparatus 100 is configured to control display of areas of interest within a segment of the video stream. It is understood that the processor 102 may perform such a controlling of the display of the areas of interest for the plurality of segments within the video stream so as to provide a comfortable and pleasant viewing experience to a viewer. An example representation for illustrating controlling of video display across a plurality of segments of a video stream is explained with reference to FIGS. 5A to 5I.

Figure 5A:
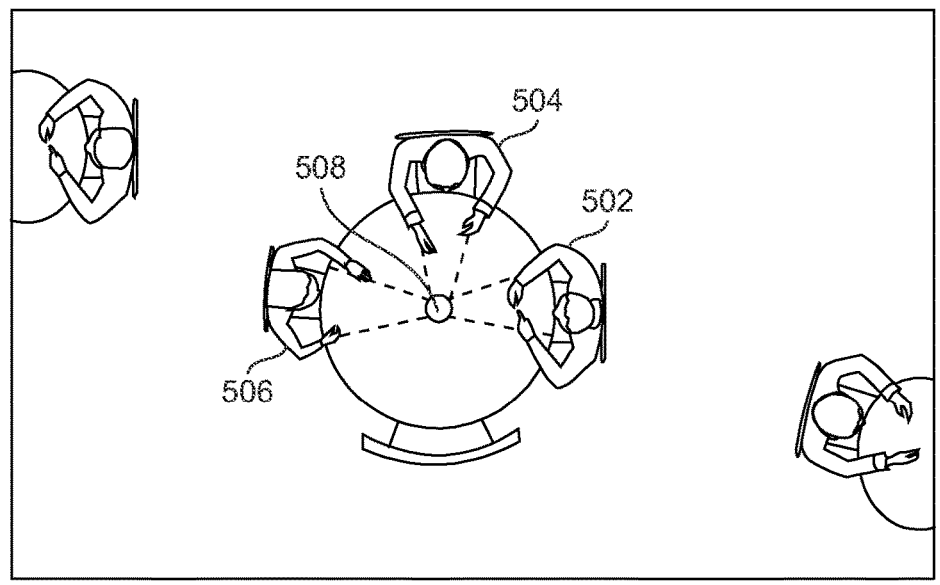
FIGS. 5A-5I show an example representation of an example scenario for illustrating a controlling of display of a video stream, in accordance with an example embodiment.

FIG. 5A is a diagram illustrating an example representation of a segment 500 of a video stream, in accordance with an example embodiment. The segment 500 depicts three people engaged in a conversation, referred to herein as a participant 502, a participant 504 and a participant 506, who are engaged in a conversation in a restaurant. The segment 500 is a part of a plurality of segments of a video stream captured using a '360 camera' 508 (referred to hereinafter as the camera 508). The camera 508 is configured to capture the on-going conversation and to generate the video stream including the various segments, such as the segment 500. For each segment, the processor 102 may be configured to detect active objects, or in this case, who are the current set of participants in the conversation, and identify areas of interest in the segment 500. Further, the processor 102 is configured to control display of the identified areas of interest as explained with reference to FIGS. 2A-4B. The processor 102 is configured to perform this sequence of operations for each segment so as to provide an improved viewing experience to the viewer.

Figure 5B:
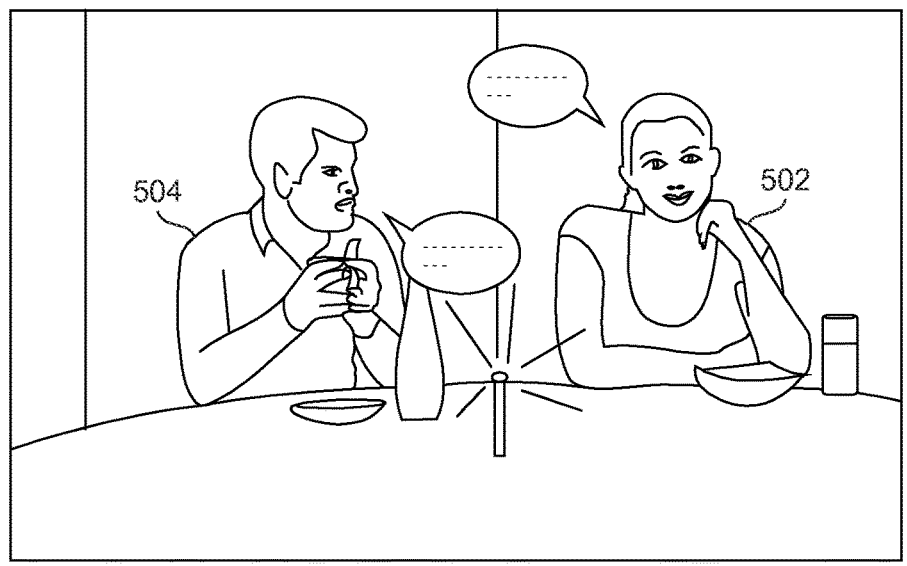
Figure 5C:
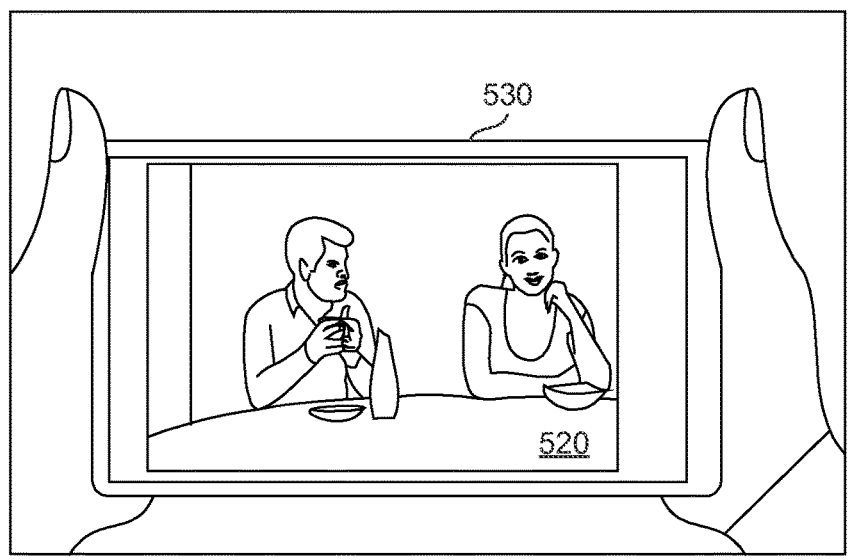
Figure 5D:
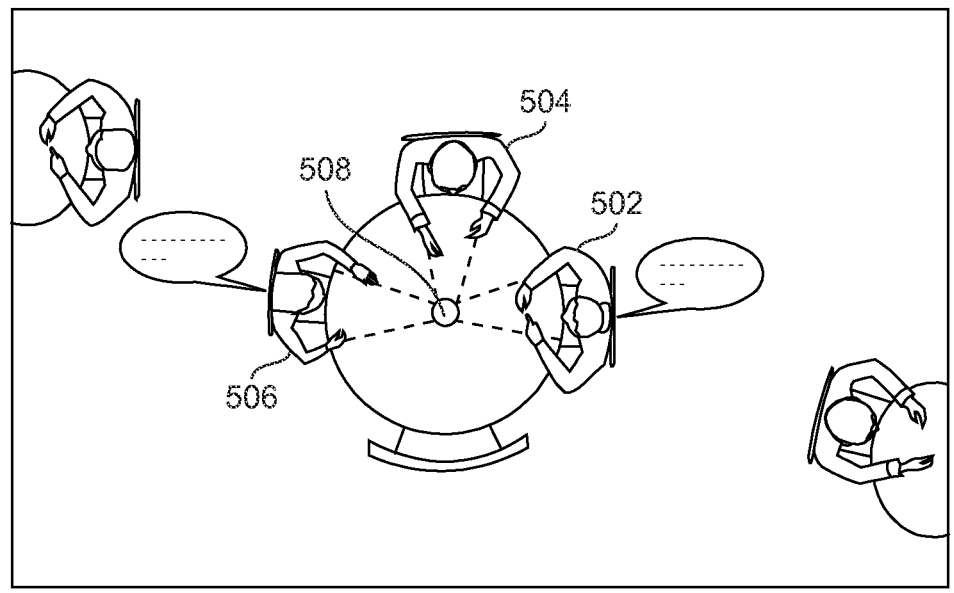
Figure 5E:
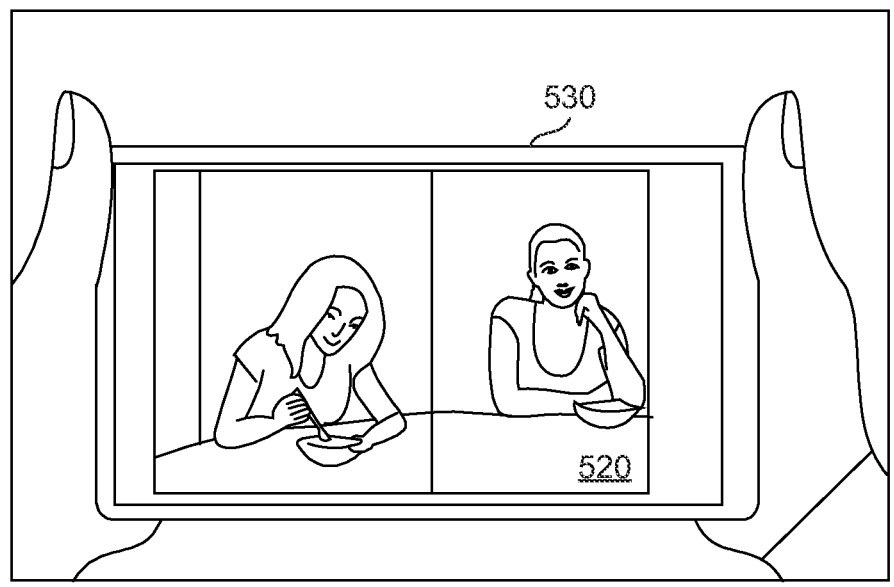
Figure 5F:
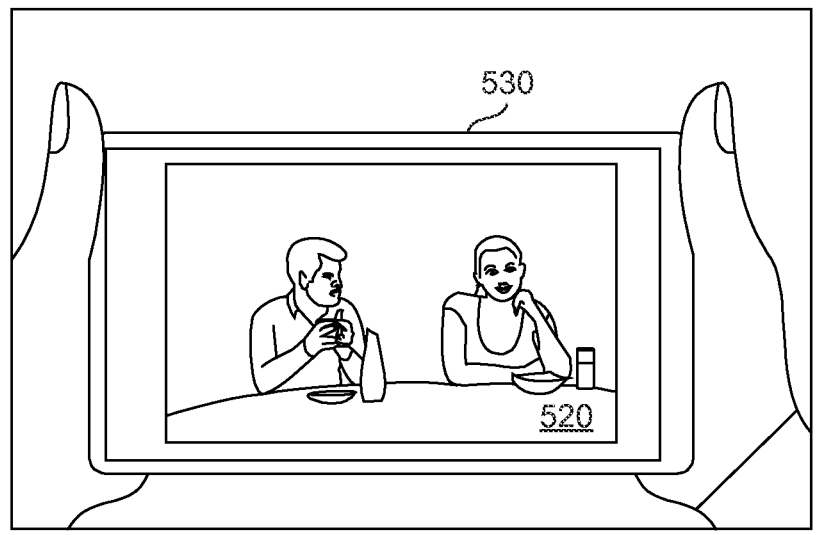
Figure 5G:
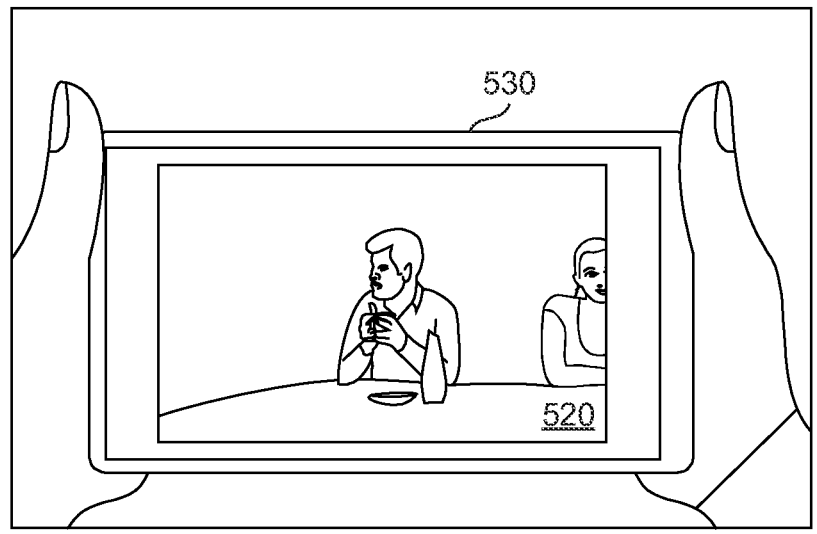
Figure 5H:
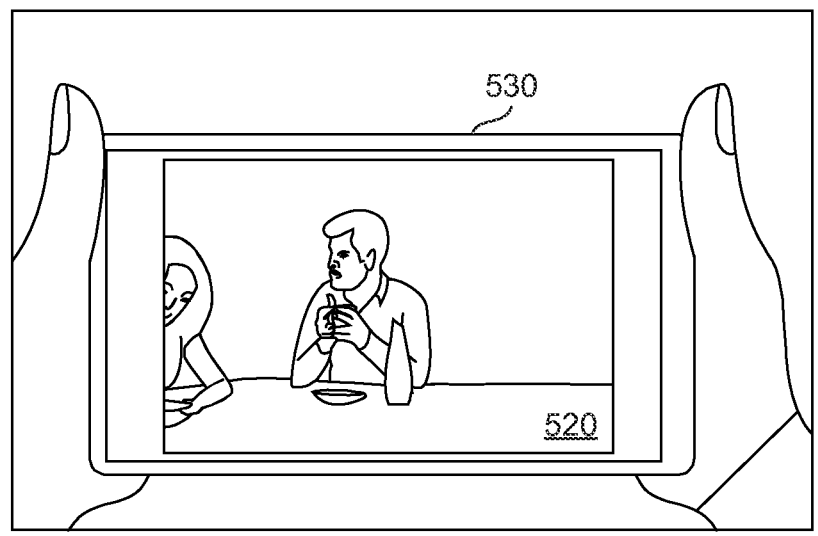
Figure 5I:
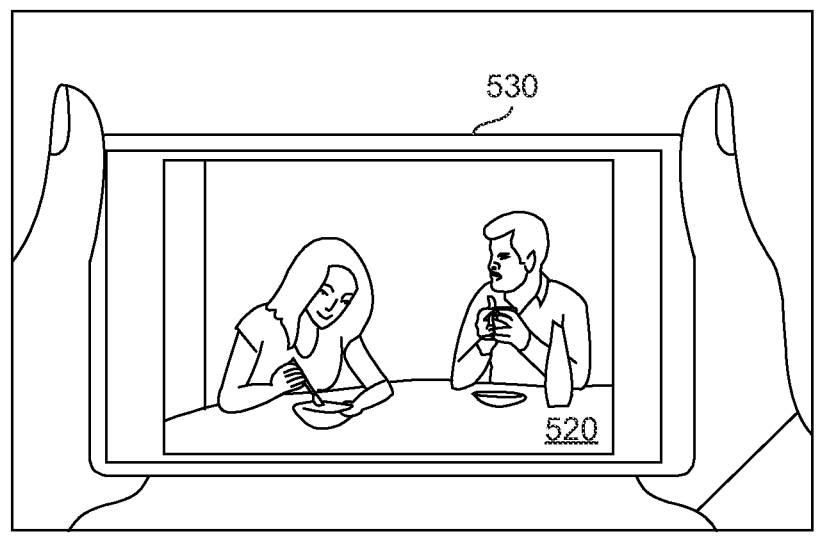

Accordingly, as the conversation between the participants 502, 504 and 506 progresses, the camera 508 is configured to capture the corresponding video and provide the video stream to the processor 102. The processor 102 is configured to perform the above-mentioned sequence of operations on each segment of the video stream so as to provide appropriate video display to the viewer. FIG. 5B depicts one such segment 510, where the participants 502 and 504 are engaged in a conversation. In such a situation, the processor 102 may identify the participants 502 and 504 as active objects and identify areas of interest to include the participants 502 and 504. Upon determining that the participants 502 and 504 are capable of being simultaneously presented within a single view of the display screen of a viewer's electronic device, the processor 102 is configured to facilitate display of the video of the two participants engaged in the conversation on a display screen 520 of a viewer's electronic device 530 as depicted in FIG. 5C. The processor 102 may be configured to display the video of the two participants engaged in the conversation on a display screen 520 of the viewer's electronic device 530 till the conversation continues between the two participants. As the conversation progresses, in an example scenario, the participant 506 may communicate with the participant 502 as depicted exemplarily in FIG. 5D. In such a situation, the processor 102 may identify the participants 502 and 506 as active objects and identify areas of interest to include the participants 502 and 506. Upon determining that the participants 502 and 504 are not capable of being simultaneously presented within a single view of the display screen of a viewer's electronic device, the processor 102 is configured to facilitate display of the video of the two participants engaged in the conversation in a split screen arrangement on the display screen 520 of the viewer's electronic device 530 as depicted in FIG. 5E. Thus, the processor 102 using face and sound detection creates a composition that preserves the natural flow of conversation. More specifically, upon detecting people engaged in a conversation, the processor 102 first tries to frame a view such that both participants are included in the view area. If the location of participants is such that they cannot be included in same frame, then the processor 102 automatically changes to the split screen arrangement. As the conversation continues, the viewpoint moves, again accommodating to include both participants while changing between framing and split screens as needed. Further, the processor 102 is configured to facilitate a smooth transition by fading out and fading in to different view angles, instead of jumping back and forth between image frames displaying the participants. For example, consider a scenario where the participants 502 and 504 are initially involved in a conversation and the conversation switches to a dialogue between the participants 504 and 506. In such a scenario, upon detecting a change in the display priority, the processor 102 may be configured to include intermittent field frames between the displays showing the two participants involved in the conversation such that a display gradually pans from showing the participants 502 and 504 on the display screen 520 to a display showing the participants 504 and 506 as exemplarily depicted in FIGS. 5F, 5G, 5H and 5I. More specifically, the processor 102 introduces intermittent field frames corresponding to the displays depicted in FIGS. 5G and 5H in-between showing areas of interest as depicted in FIGS. 5F and 5I so as to provide a pleasant and comfortable viewing experience to the viewer.

Further as explained with reference to FIG. 2, the processor 102 is configured to detect the pace of conversation and use more peaceful transitions for calm, slow discussion and use more aggressive, quick transitions when the discussion is very active and lively.

Figure 6A:
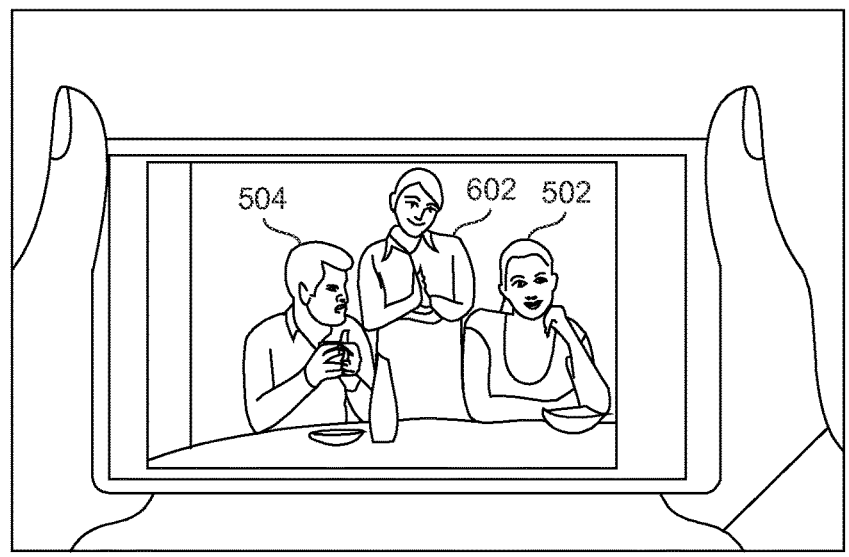
FIGS. 6A-6B show an example representation of an example scenario for illustrating a controlling of display of a video stream upon detecting a significant change in a scene, in accordance with an example embodiment.
Figure 6B:
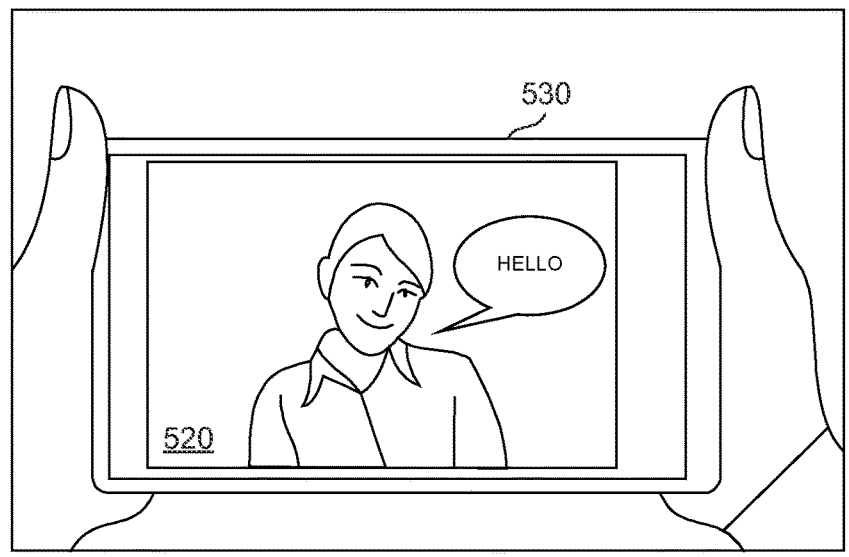

In some embodiments, the processor 102 is further configured to use motion detection, heat detection and other such mechanisms to detect significant changes to an ongoing scene. For example, if a waitress 602 comes by during the discussion between the participants 502 and 504 as depicted in FIG. 6A, then the processor 102 is configured to detect arrival of a new person and further identify the waitress as an active object as the waitress speaks. The processor 102 is further configured to control the video display to provide a close-up of the waitress's face on the display screen 520 of the viewer's electronic device 530 as depicted in FIG. 6B, to preserve the natural flow of the conversation. Thus, upon detecting a change in the display priority with an entry of a new person in the scene, the display is transitioned from a portion of the segment showing the participants engaged in a conversation (now assigned lower display priority) to a portion of the segment with showing the waitress (which is assigned higher display priority as interruptions to a scene are associated with higher display priority) to preserve the natural flow of the conversation.

In some embodiments, the processor 102 is configured to deem one or more people recognized throughout the video as important people and the prioritize display of the areas of interest including such people and provide them with more screen time. Moreover, the processor 102 is configured to track the faces of the identified important people until they leave the scene, with the split screen feature accommodating them until they are not visible anymore.

As explained with reference to FIG. 1, the processor 102 is configured to determine a display priority for each area of interest and further determine if the two or more areas of interest are capable of being simultaneously presented on the display screen. The processor 102 may compute distance between active objects and/or areas of interest to determine if the two or more areas of interest are capable of being simultaneously presented on the display screen or not. However, in some embodiments, the processor 102 is configured to determine whether the two or more areas of interest are capable of being simultaneously presented in the single view on the display screen based on a number of active objects associated with the two or more areas of interest. For example, if the segment includes a group of people, then based on the number of people involved in the group, the processor 102 may determine how to control to display of the video stream. A flow diagram for framing a group of people is depicted in FIG. 7.

Figure 7:
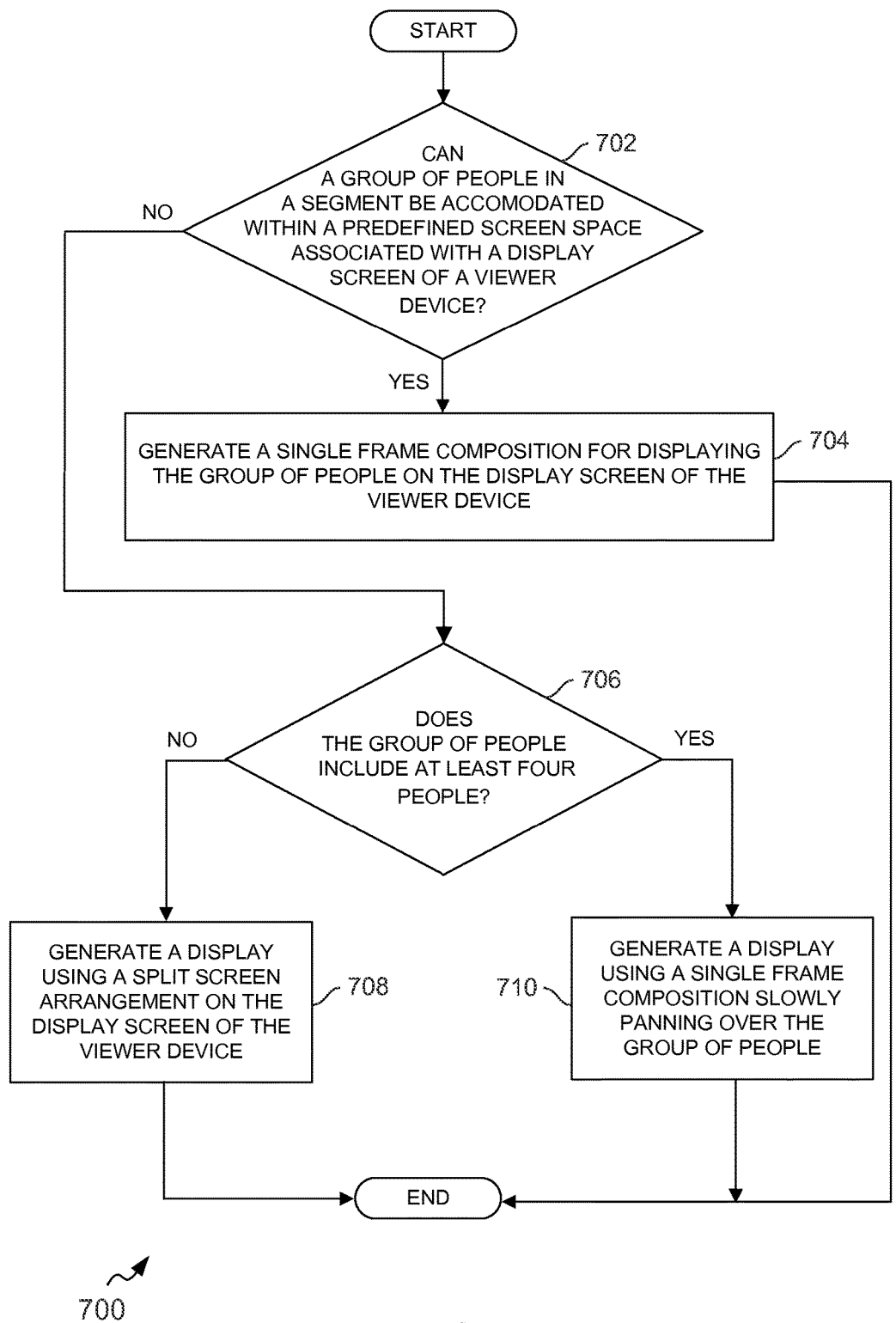
FIG. 7 illustrates an example flow diagram of a method for framing a display of a video stream including a group of people, in accordance with an example embodiment.

FIG. 7 illustrates an example flow diagram of a method 700 for framing a display of a video stream including a group of people in accordance with an example embodiment. Operations of the method 700 may be performed by, among other examples, the apparatus 100 of FIG. 1.

At 702, the method 700 includes determining if the group of people in a segment can be accommodated within a predefined screen space associated with a display screen of a viewer device. In an embodiment, the determination of whether the group of the people in the segment can be accommodated within the predefined screen space associated with the display screen may be performed by identifying areas of interest, computing distances among the areas of interest and comparing the distances to a predetermined distance measure as explained with reference to FIG. 1. If it is determined that the group of people can be accommodated within a predefined screen space, then 704 is performed. If it is determined that the group of people cannot be accommodated within a predefined screen space, then 706 is performed.

At 704, the method 700 includes generating a single frame composition for displaying the group of people on the display screen of the viewer device. At 706, the method 700 includes determining if the group of people includes at least four people. If the group of people includes four or less number of people then 708 is performed. If the group of people include more than four people than 710 is performed.

At 708, the method 700 includes generating a display using a split screen arrangement (for example, two or more split screen portions) on the display screen of the viewer device. The display using the split screen arrangement may be generated as explained with reference to FIG. 2G.

At 710, the method 700 includes generating a display using a single frame composition slowly panning over the group of people.

Figure 8A:
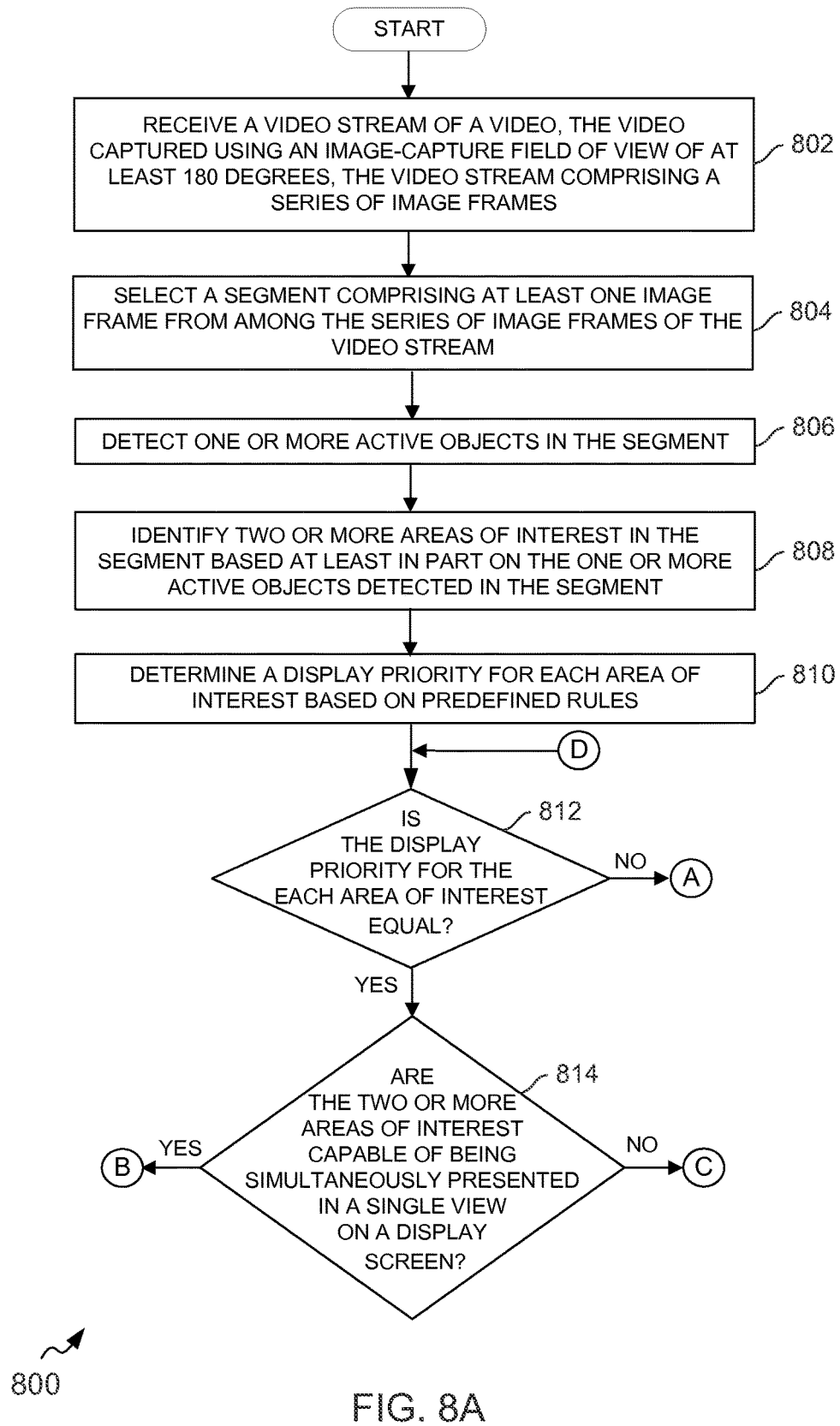
FIGS. 8A-8B illustrate an example flow diagram of a method for controlling video content displayed to a viewer, in accordance with an example embodiment.
Figure 8B:
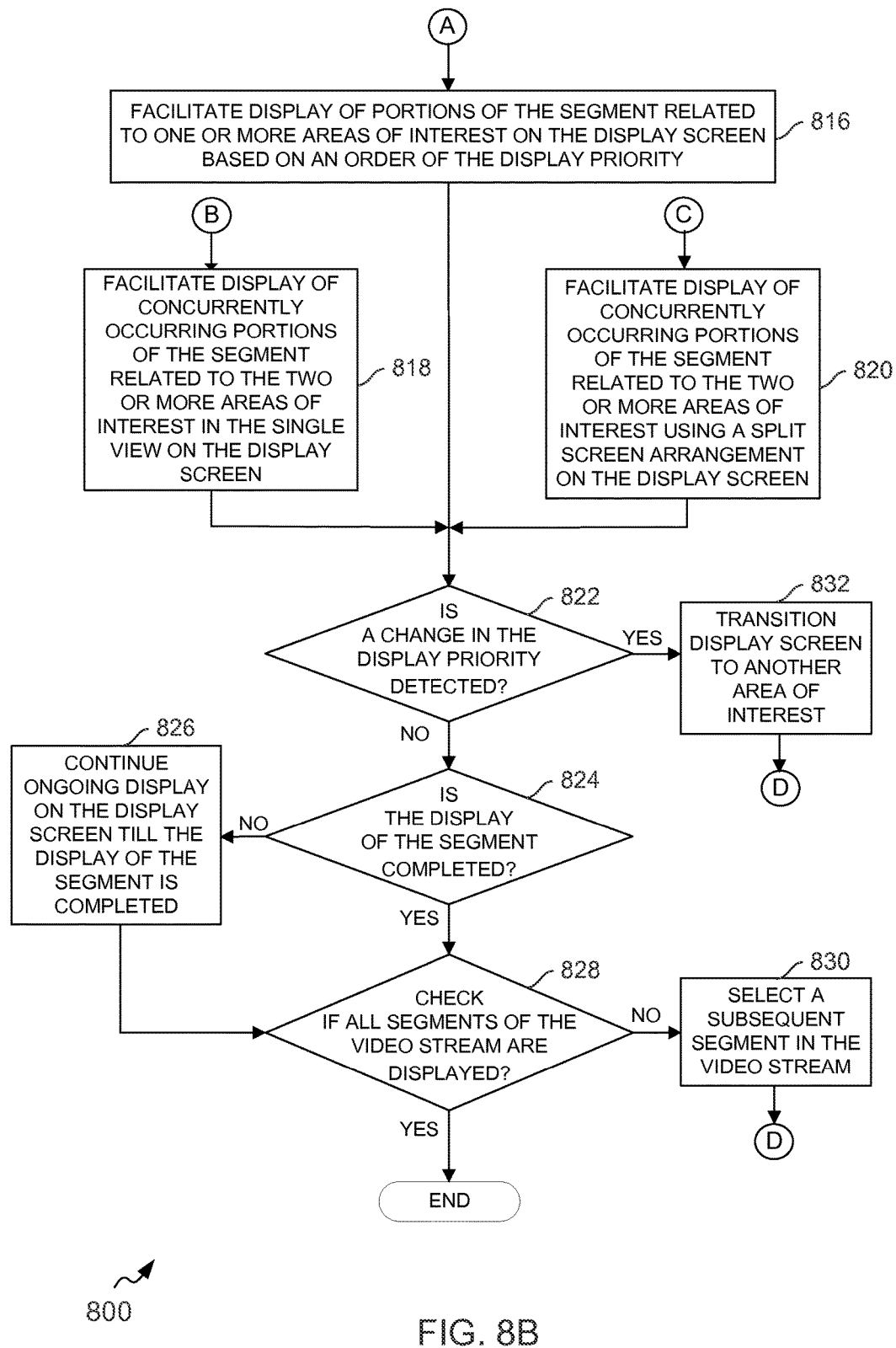

Some example embodiments of methods of controlling video content displayed to a viewer are described herein with references to FIG. 8A-8B. Any of the disclosed methods can be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer or image processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

FIGS. 8A-8B illustrates an example flow diagram of a method 800 for controlling video content displayed to a viewer, in accordance with an example embodiment. Operations of the method 800 may be performed by, among other examples, the apparatus 100 of FIG. 1.

At 802, the method 800 includes receiving a video stream of a video. The video captured using an image-capture field of view of at least 180 degrees. The video stream of the video may be received from one or more cameras, such as for example cameras in a stereo camera setup, which may capture a video of a scene from multiple viewpoints to generate a video stream associated with an image-capture field of view of at least 180 degrees. Alternatively, in an embodiment, the video stream may be received from a single camera, such as a '360 camera', associated with an image-capture field of view of 360 degrees in the horizontal direction and the vertical direction. Accordingly, the video may be captured using multiple cameras such that the combined image-capture field of view is at least 180 degrees, or, the video may be captured using a single camera, such as the '360 camera' associated with an image-capture field of view of 360 degrees. In at least one embodiment, the video stream includes a series of image frames.

At 804, the method 800 includes selecting a segment including at least one image frame from among the series of image frames of the video stream. In some embodiments, where the series of image frames includes a large number of image frames, a segment may be chosen to include multiple image frames (for example, a large number of image frames related to a particular scene), whereas in some embodiments, where the series of image frames includes a small number of image frames, a segment may be chosen to include only few image frames (for example, image frames related to a particular action or a movement). Moreover, in some embodiments, the segment may include all the image frames corresponding to the video stream, whereas in some embodiments, each segment may include only one image frame corresponding to the video stream.

At 806, the method 800 includes detecting one or more active objects in the segment. As explained with reference to FIG. 1, the term 'active object' as used herein refers to an entity associated with movement or sound. In an embodiment, the one or more active objects may be detected using any of face detection, gaze detection, sound detection, motion detection, thermal detection, whiteboard detection and background scene detection.

At 808, the method 800 includes identifying two or more areas of interest in the segment based at least in part on the one or more active objects detected in the segment. At 810, the method 800 includes determining a display priority for each area of interest based on predefined rules. At 812, the method 800 includes determining whether the display priority for the each area of interest is equal or not. The identification of areas of interest, determination of display priorities for the areas of interest based on predefined rules and determining whether the display priorities for the areas of interest are equal or not may be performed as explained with reference to FIGS. 1 to 6B and are not explained herein.

If the display priority for the each area of interest is determined to be equal then 814 is performed. If the display priority for the each area of interest is determined to be unequal then 816 is performed.

At 814, the method 800 includes determining whether the two or more areas of interest are capable of being simultaneously presented in a single view on a display screen.

If it is determined at 814 that the two or more areas of interest are capable of being simultaneously presented in the single view on the display screen then 818 is performed. If it is determined at 814 that the two or more areas of interest are not capable of being simultaneously presented in the single view on a display screen then 820 is performed. The determining of whether the two or more areas of interest are capable of being simultaneously presented or not may be performed as explained with reference to FIGS. 1 to 7 and is not explained again herein.

At 818, the method 800 includes facilitating display of concurrently occurring portions of the segment related to the two or more areas of interest in the single view on the display screen. Thereafter 822 is performed.

At 820, the method 800 includes facilitating display of the concurrently occurring portions of the segment related to the two or more areas of interest using a split screen arrangement on the display screen. Thereafter 822 is performed.

At 816, the method 800 includes facilitating display of portions of the segment related to one or more areas of interest on the display screen based on an order of the display priority for the each area of interest. For example, the processor 102 may display the areas of interest with high display priorities to a viewer in a single view or one after another. For example, concurrently occurring portions of the areas of interest with high display priorities may be displayed to the viewer in a single view or display of one area of high interest may be followed by another area of interest with relatively lower area of interest. Thereafter 822 is performed.

At 822, the method 800 determines whether a change in display priority is detected or not. If a change in the display priority is detected, then the method 800 repeats steps from 812 to 822 till no change in the display priority is detected at 822. As explained with reference to FIGS. 1 to 7, the display screen may be controlled to display identified areas of interests based on an order of display priority to a viewer, such that one or more areas of interest with high priorities are always displayed to a viewer. Upon detecting a change in the display priority at 822 (for example, upon detecting an area of interest with currently high display priority is now associated with a lower display priority), the display on the display screen is transitioned at 832 to another area of interest, e.g. to one with higher display priority.

In at least one example embodiment, a transition from the area of interest with the lower display priority to the area of interest with the higher display priority may be configured in such a manner that the image frame being displayed does not jump awkwardly from one scene to another and instead affords a viewer of the display screen, a gradual display experience from the one area of interest to the another area of interest. In an embodiment, the transitioning of the display may be controlled as per a predefined pace of display transition as explained with reference to FIGS. 2A to 2G.

If no change in the display priority is detected, then the method 800 determines whether the display of the segment is completed or not at 824. If it is determined that the display of the segment is not completed, then at 826, an on-going display on the display screen is continued till the display of the segment is completed. If it is determined that the display of the segment is completed then at 828, the method 800 includes checking if all segments of the video stream are displayed. If yes, the method 800 is terminated. If all segments of the video stream are not displayed, then a subsequent segment in the video stream is selected at 830 and operations 806-828 are repeated till all segments of the video stream are displayed.

Figure 9:
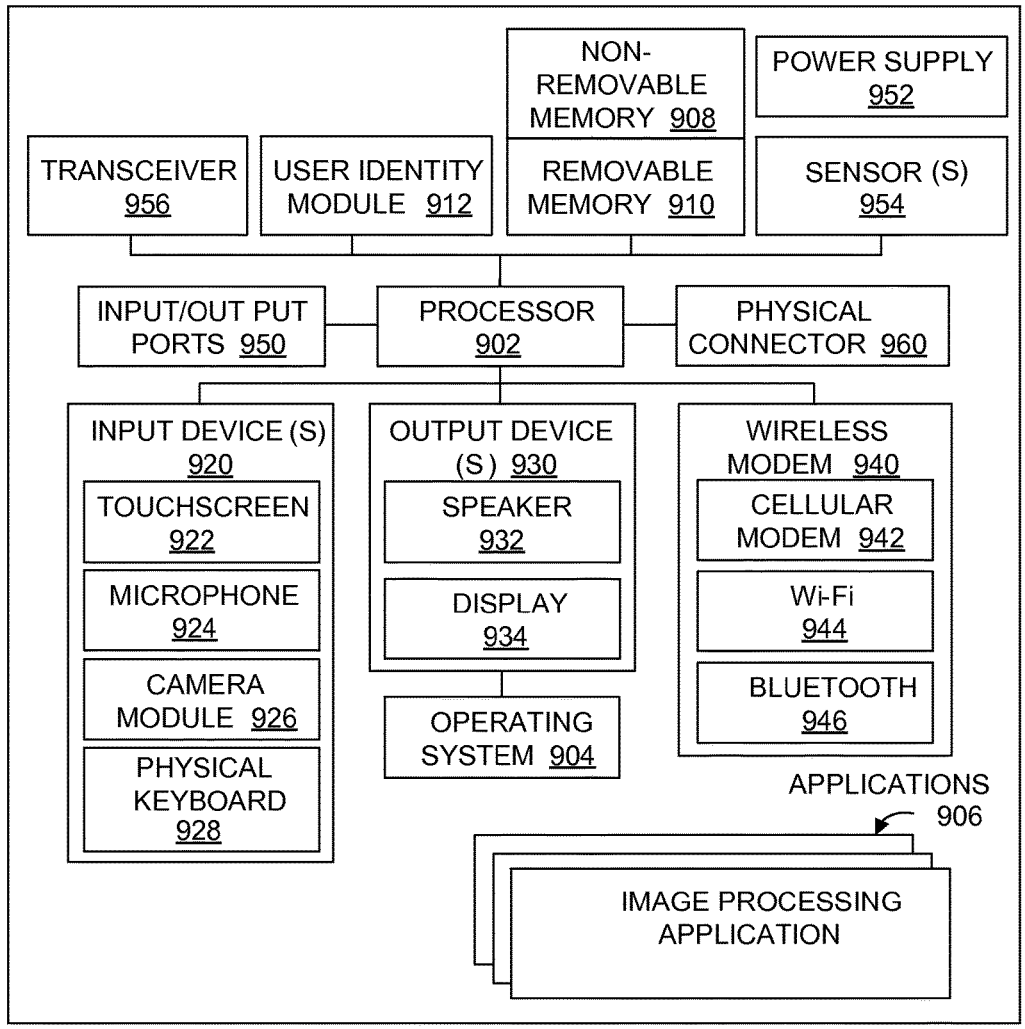
FIG. 9 illustrates an example of a mobile device capable of implementing example embodiments described herein.

Referring now to FIG. 9, a schematic block diagram of a mobile device 900 is shown that is capable of implementing embodiments of techniques for controlling display of video content to a viewer as described herein. It should be understood that the mobile device 900 as illustrated and hereinafter described is merely illustrative of one type of device and should not be taken to limit the scope of the embodiments. As such, it should be appreciated that at least some of the components described below in connection with the mobile device 900 may be optional and thus in an example embodiment may include more, less or different components than those described in connection with the example embodiment of FIG. 9. As such, among other examples, the mobile device 900 could be any of device from among mobile electronic devices, such as for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 900 includes a controller or a processor 902 (e.g., a signal processor, microprocessor, ASIC, or other control and processing logic circuitry) for performing tasks such as signal coding, data processing, image processing, input/output processing, power control, and/or other functions. An operating system 904 controls the allocation and usage of the components of the mobile device 900 and support for one or more applications programs (see, applications 906), configured to support capturing of series of image frames and controlling their display, that implements one or more of the innovative features described herein. In addition to video capture application; the application programs may include common mobile computing applications (e.g., telephony applications, email applications, calendars, contact managers, web browsers, messaging applications) or any other computing application.

The illustrated mobile device 900 includes one or more memory components, for example, a non-removable memory 908 and/or removable memory 910. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the applications 906. Examples of data can include web pages, text, images, sound files, image data, video data, or other data sets to be sent to and/or received from one or more network servers or other devices via one or more wired or wireless networks. The mobile device 900 may further include a user identity module (UIM) 912. The UIM 912 may be a memory device having a processor built in. The UIM 912 may include, for example, a SIM, a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile device 900 can support one or more input devices 920 and one or more output devices 930. Examples of the input devices 920 may include, but are not limited to, a touch screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video image frames) and a physical keyboard 928. Examples of the output devices 930 may include, but are not limited to a speaker 932 and a display 934. Other possible output devices (not shown) can include piezoelectric or other haptic output devices. Some devices can serve more than one input/output function. For example, the touch screen 922 and the display 934 can be combined into a single input/output device.

In an embodiment, the camera module 926 may include a digital camera capable of forming a video stream from a captured video. In some implementations, the camera module 926 may include two or more cameras, for example, a front camera and a rear camera positioned on two sides of the mobile device 900 (e.g., in a mobile device). As such, the camera module 926 includes all hardware, such as a lens or other optical component(s), and software for creating a video stream from a captured video. Alternatively, the camera module 926 may include the hardware needed to view the video, while a memory device of the mobile device 900 stores instructions for execution by the processor 902 in the form of software to create a video stream from a captured video. In an example embodiment, the camera module 926 may further include a processing element such as a co-processor, which assists the processor 902 in processing image frame data and an encoder and/or decoder for compressing and/or decompressing image data. In an embodiment, the camera module 926 may provide live image data (viewfinder image data) to the display 934.

A wireless modem 940 can be coupled to one or more antennas (not shown in FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi-compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the mobile device and a public switched telephone network (PSTN).

The mobile device 900 can further include one or more input/output ports 950, a power supply 952, one or more sensors 954 for example, an accelerometer, a gyroscope, a compass, or an infrared proximity sensor for detecting the orientation or motion of the mobile device 900, a transceiver 956 (for wirelessly transmitting analog or digital signals) and/or a physical connector 960, which can be a USB port, IEEE 1394 (FireWire) port, and/or RS-232 port. The illustrated components are not required or all-inclusive, as any of the components shown can be deleted and other components can be added.

With the image frame processing applications and/or other software or hardware components, the mobile device 900 can implement the technologies described herein. For example, the processor 902 can facilitate capture of series of image frames of a scene through the camera module 926 and perform post-processing of the captured series of image frames.

Although the mobile device 900 is illustrated in FIG. 9 in form of a smartphone, but more particularly, the techniques and solutions described herein can be implemented with connected devices having other screen capabilities and device form factors, such as a tablet computer, a virtual reality device connected to a mobile or desktop computer, an image sensor attached to a gaming console or television, and the like.

An embodiment of a method comprises
receiving a video stream of a video, the video captured using an image-capture field of view of at least 180 degrees, the video stream comprising a series of image frames;
identifying two or more areas of interest in a segment comprising at least one image frame from among the series of image frames of the video stream, the two or more areas of interest identified based at least in part on one or more active objects detected in the segment;
determining a display priority for each area of interest from among the two or more areas of interest based on predefined rules;
determining whether the display priority for the each area of interest is equal;
in response to determining the display priority for the each area of interest to be equal, determining whether the two or more areas of interest are capable of being simultaneously presented in a single view on a display screen, and, performing one of:
facilitating display of concurrently occurring portions of the segment related to the two or more areas of interest in the single view on the display screen if the two or more areas of interest are capable of being simultaneously presented in the single view on the display screen; and
facilitating display of the concurrently occurring portions of the segment related to the two or more areas of interest using a split screen arrangement on the display screen if the two or more areas of interest are not capable of being simultaneously presented in the single view on the display screen; and
in response to determining the display priority for the each area of interest to be unequal, performing:
facilitating display of portions of the segment related to one or more areas of interest from among the two or more areas of interest on the display screen based on an order of the display priority for the each area of interest,
wherein the display on the display screen is transitioned based on a change detected in the display priority of at least one area of interest from among the two or more areas of interest, the display transitioned using a predefined pace of display transition.

In one embodiment of the method the display is transitioned from an area of interest associated with a lower display priority to an area of interest associated with a higher display priority.

In one embodiment of the method, alternatively or in addition, the display is transitioned from an area of interest associated with a higher display priority to an area of interest associated with a lower display priority.

In one embodiment of the method, alternatively or in addition, the video is captured using a camera associated with the image-capture field of view of 360 degrees in at least one of a horizontal direction and a vertical direction.

In one embodiment of the method, alternatively or in addition, an active object from among the one or more active objects corresponds to an entity associated with at least one of motion and sound.

In one embodiment of the method, alternatively or in addition, the two or more areas of interest in the segment are identified based on detecting the one or more active objects using at least one of face detection, sound detection, motion detection, thermal detection, gaze detection, posture detection, background scene detection and whiteboard detection.

In one embodiment of the method, alternatively or in addition, the predefined rules comprise a plurality of rules for assigning the display priority to the each area of interest based on an involvement of at least one of sound, motion, object posture and a change of scene in the each area of interest within the segment.

In one embodiment of the method, alternatively or in addition, the plurality of rules for assigning the display priority comprise one or more rules for assigning the display priority to the each area of interest based on whether the video stream is to be displayed on the display screen as a streaming video stream or a recorded video stream.

In one embodiment, alternatively or in addition, the method further comprises
computing distances from the each area of interest to remaining areas of interest from among the two or more areas of interest;
comparing the computed distances with a predetermined distance measure; and
determining one of:
the two or more areas of interest are capable of being simultaneously presented in the single view on the display screen if the computed distances are less than or equal to the predetermined distance measure; and
the two or more areas of interest are not capable of being simultaneously presented in the single view on the display screen if the computed distances are greater than the predetermined distance measure.

In one embodiment of the method, alternatively or in addition, the predetermined distance measure is computed based at least in part on an aspect ratio of the display screen configured to display the video stream.

In one embodiment of the method, alternatively or in addition, determining whether the two or more areas of interest are capable of being simultaneously presented in the single view on the display screen is performed based on a number of active objects associated with the two or more areas of interest.

In one embodiment of the method, alternatively or in addition, the predefined pace of display transition is configured to afford to a viewer of the display screen, a gradual display experience from the one area of interest to the another area of interest, and wherein the predefined pace of display transition is configured to be adjusted to a rate of motion activity or sound activity associated with the one or more active objects within the two or more areas of interest.

An embodiment of an apparatus comprises
at least one processor; and
at least one memory comprising computer program code, the at least one memory and the computer program code configured to, with the at least one processor, cause the apparatus to at least perform:
receive a video stream of a video, the video captured using an image-capture field of view of at least 180 degrees, the video stream comprising a series of image frames;
identify two or more areas of interest in a segment comprising at least one image frame from among the series of image frames of the video stream, the two or more areas of interest identified based at least in part on one or more active objects detected in the segment;
determine a display priority for each area of interest from among the two or more areas of interest based on predefined rules;
determine whether the display priority for the each area of interest is equal;
in response to determining the display priority for the each area of interest to be equal, determine whether the two or more areas of interest are capable of being simultaneously presented in a single view on a display screen, and, perform one of:
facilitate display of concurrently occurring portions of the segment related to the two or more areas of interest in the single view on the display screen if the two or more areas of interest are capable of being simultaneously presented in the single view on the display screen; and
facilitate display of the concurrently occurring portions of the segment related to the two or more areas of interest using a split screen arrangement on the display screen if the two or more areas of interest are not capable of being simultaneously presented in the single view on the display screen; and
in response to determining the display priority for the each area of interest to be unequal, perform:
facilitate display of portions of the segment related to one or more areas of interest from among the two or more areas of interest on the display screen based on an order of the display priority for the each area of interest,
wherein the display on the display screen is transitioned based on a change detected in the display priority of at least one area of interest from among the two or more areas of interest, the display transitioned using a predefined pace of display transition.

In one embodiment of the apparatus, the apparatus further comprises a camera configured to capture the video, the camera associated with the image-capture field of view of 360 degrees in at least one of a horizontal direction and a vertical direction.

In one embodiment of the apparatus, alternatively or in addition, the apparatus is further caused, at least in part to perform one of:
transition the display from an area of interest associated with a lower display priority to an area of interest associated with a higher display priority; and
transition the display from an area of interest associated with a higher display priority to an area of interest associated with a lower display priority.

In one embodiment of the apparatus, alternatively or in addition, the apparatus is further caused, at least in part to:
compute distances from the each area of interest to remaining areas of interest from among the two or more areas of interest;
compare the computed distances with a predetermined distance measure, the predetermined distance measure computed based at least in part on an aspect ratio of the display screen configured to display the video stream; and
determine one of:
the two or more areas of interest are capable of being simultaneously presented in the single view on the display screen if the computed distances are less than or equal to the predetermined distance measure; and
the two or more areas of interest are not capable of being simultaneously presented in the single view on the display screen if the computed distances are greater than the predetermined distance measure.

In one embodiment of the apparatus, alternatively or in addition, the predefined pace of display transition is configured to afford to a viewer of the display screen, a gradual display experience from the one area of interest to the another area of interest, and, wherein the predefined pace of display transition is configured to be adjusted to a rate of motion activity or sound activity associated with the one or more active objects within the two or more areas of interest.

An embodiment of a computer program product comprises at least one computer-readable storage medium, the computer-readable storage medium comprising a set of instructions, which, when executed by one or more processors, cause an apparatus to at least perform:
receive a video stream of a video, the video captured using an image-capture field of view of at least 180 degrees, the video stream comprising a series of image frames;
identify two or more areas of interest in a segment comprising at least one image frame from among the series of image frames of the video stream, the two or more areas of interest identified based at least in part on one or more active objects detected in the segment;
determine a display priority for each area of interest from among the two or more areas of interest based on predefined rules;
determine whether the display priority for the each area of interest is equal;
in response to determining the display priority for the each area of interest to be equal, determine whether the two or more areas of interest are capable of being simultaneously presented in a single view on a display screen, and, perform one of:
facilitate display of concurrently occurring portions of the segment related to the two or more areas of interest in the single view on the display screen if the two or more areas of interest are capable of being simultaneously presented in the single view on the display screen; and facilitate display of the concurrently occurring portions of the segment related to the two or more areas of interest using a split screen arrangement on the display screen if the two or more areas of interest are not capable of being simultaneously presented in the single view on the display screen; and in response to determining the display priority for the each area of interest to be unequal, perform:

facilitate display of portions of the segment related to one or more areas of interest from among the two or more areas of interest on the display screen based on an order of the display priority for the each area of interest, wherein the display on the display screen is transitioned based on a change detected in the display priority of at least one area of interest from among the two or more areas of interest, the display transitioned using a predefined pace of display transition.

In one embodiment of the computer program product the predefined rules comprise a plurality of rules for assigning the display priority to the each area of interest based on an involvement of at least one of sound, motion, object posture and a change of scene in the each area of interest within the segment.

In one embodiment of the computer program product, alternatively or in addition, the apparatus is further caused, at least in part to:

compute distances from the each area of interest to remaining areas of interest from among the two or more areas of interest;

compare the computed distances with a predetermined distance measure, the predetermined distance measure computed based at least in part on an aspect ratio of the display screen configured to display the video stream; and determine one of:

the two or more areas of interest are capable of being simultaneously presented in the single view on the display screen if the computed distances are less than or equal to the predetermined distance measure; and the two or more areas of interest are not capable of being simultaneously presented in the single view on the display screen if the computed distances are greater than the predetermined distance measure.

Various example embodiments offer, among other benefits, techniques for controlling video content displayed to viewer. The various embodiments disclosed herein provide a pleasant and comfortable viewing experience to a viewer of the video content. Further, the techniques suggested herein enable control of the video display by framing the video footage in a manner that a default viewpoint composition (for example, a single view, a split screen or single view in order of priority as needed) is presented to the user. This way the viewer does not need to constantly adjust the viewpoint of the video stream in order to receive an optimal viewing experience. Further, the techniques disclosed herein facilitate smooth transition, fading out and fading in to different view angles, instead of jumping back and forth between image frames which was distracting for the viewer. Furthermore, the transitioning of display from one image frame to another may be adjusted based on rate of activity (for example, sound activity or motion activity) so as to provide an improved viewing experience to a viewer. In some embodiments, such as for cases involving recorded video streams, the viewer may also be enabled to manipulate the view (as the video is captured using an image-capture field of view of at least 180 degrees) so as to explore additional portions of the video stream than those displayed on the display screen.

It is noted that various example embodiments as described herein may be implemented in a wide variety of devices, network configurations and applications for example, in camera devices, in mobile devices or as part of software imaging applications used in any electronic devices.

Computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

Alternatively, or in addition, the functionality described herein (such as the image processing instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

It will be understood that the benefits and advantages described above may relate to one embodiment or may relate to several embodiments. The embodiments are not limited to those that solve any or all of the stated problems or those that have any or all of the stated benefits and advantages.

The steps of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method for controlling a video display, the method comprising:
   capturing a video stream of a video, the video captured with at least one camera, using an image-capture field of view of at least 180 degrees;
   identifying, by a processor, two or more areas of interest in the video stream comprising at least one image frame from among a series of image frames of the video stream, the two or more areas of interest identified based at least in part on one or more active objects detected in the video stream;
   determining, by a processor, a display priority for each area of interest from among the two or more areas of interest based on predefined rules for assigning the display priority to the each area of interest based on an at least one of sound, motion, object posture or change of scene in the each area of interest;
   determining, by a processor, whether the display priority for the each area of interest is equal or not;
   in response to determining, by a processor, the display priority for the each area of interest to be equal by comparing the display priority assigned to the each area of interest, determining, by a processor, whether the two or more areas of interest are capable of being simultaneously presented in a single view on a display screen, and, performing:
   facilitating, by a processor, display of concurrently occurring portions of the video stream related to the two or more areas of interest in the single view on the display screen if the two or more areas of interest are capable of being simultaneously presented in the single view on the display screen; and
   facilitating, by a processor, display of the concurrently occurring portions of the video stream related to the two or more areas of interest using a split screen arrangement on the display screen if the two or more areas of interest are not capable of being simultaneously presented in the single view on the display screen; and
   in response to determining the display priority for the each area of interest to be unequal, facilitating display of portions of the video stream related to one or more areas of interest from among the two or more areas of interest on the display screen based on an order of the display priority for the each area of interest,
   wherein the display on the display screen is transitioned based on a change detected in the display priority of at least one area of interest from among the two or more areas of interest, the display transitioned using a predefined pace of display transition.

2. The method of claim 1, wherein the display is transitioned from an area of interest associated with a lower display priority to an area of interest associated with a higher display priority.

3. The method of claim 1, wherein the display is transitioned from an area of interest associated with a higher display priority to an area of interest associated with a lower display priority.

4. The method of claim 1, wherein the video is captured using a camera associated with the image-capture field of view of 360 degrees in at least one of a horizontal direction and a vertical direction.

5. The method of claim 1, wherein an active object from among the one or more active objects corresponds to an entity associated with at least one of motion and sound.

6. The method of claim 1, wherein the two or more areas of interest in the video stream are identified based on detecting the one or more active objects using at least one of face detection, sound detection, motion detection, thermal detection, gaze detection, posture detection, background scene detection and whiteboard detection.

7. The method of claim 1, wherein the plurality of rules for assigning the display priority further comprise one or more rules for assigning the display priority to the each area of interest based on whether the video stream is to be displayed on the display screen as a streaming video stream or a recorded video stream.

8. The method of claim 1, further comprising:
   computing distances from the each area of interest to remaining areas of interest from among the two or more areas of interest;
   comparing the computed distances with a predetermined distance measure; and
   determining one of:
   the two or more areas of interest are capable of being simultaneously presented in the single view on the display screen if the computed distances are less than or equal to the predetermined distance measure; and
   the two or more areas of interest are not capable of being simultaneously presented in the single view on the display screen if the computed distances are greater than the predetermined distance measure.

9. The method of claim 8, wherein the predetermined distance measure is computed based at least in part on an aspect ratio of the display screen configured to display the video stream.

10. The method of claim 1, wherein determining whether the two or more areas of interest are capable of being simultaneously presented in the single view on the display screen is performed based on a number of active objects associated with the two or more areas of interest.

11. The method of claim 1, wherein the predefined pace of display transition is configured to afford to a viewer of the display screen, a gradual display experience from the one area of interest to the another area of interest, and wherein the predefined pace of display transition is configured to be adjusted to a rate of motion activity or sound activity associated with the one or more active objects within the two or more areas of interest.

12. An apparatus comprising:
at least one processor;
at least one camera; and
at least one memory comprising computer program code, the at least one memory and the computer program code configured to, with the at least one processor, cause the apparatus to at least perform:
  capture a video stream of a video by the at least one camera using an image-capture field of view of at least 180 degrees;
  identify two or more areas of interest in the video stream comprising at least one image frame from among the series of image frames of the video stream, the two or more areas of interest identified based at least in part on one or more active objects detected in the video stream;
  determine a display priority for each area of interest from among the two or more areas of interest based on predefined rules for assigning the display priority to the each area of interest based on an at least one of sound, motion, object posture or change of scene in the each area of interest;
  determine whether the display priority for the each area of interest is equal or not;
  in response to determining the display priority for the each area of interest to be equal by comparing the display priority assigned to the each area of interest, determine whether the two or more areas of interest are capable of being simultaneously presented in a single view on a display screen, and, perform:
    facilitate display of concurrently occurring portions of the video stream related to the two or more areas of interest in the single view on the display screen if the two or more areas of interest are capable of being simultaneously presented in the single view on the display screen; and
    facilitate display of the concurrently occurring portions of the video stream related to the two or more areas of interest using a split screen arrangement on the display screen if the two or more areas of interest are not capable of being simultaneously presented in the single view on the display screen; and
  in response to determining the display priority for the each area of interest to be unequal, facilitate display of portions of the video stream related to one or more areas of interest from among the two or more areas of interest on the display screen based on an order of the display priority for the each area of interest,
  wherein the display on the display screen is transitioned based on a change detected in the display priority of at least one area of interest from among the two or more areas of interest, the display transitioned using a predefined pace of display transition.

13. The apparatus of claim 12, further comprising:
a camera configured to capture the video, the camera associated with the image-capture field of view of 360 degrees in at least one of a horizontal direction and a vertical direction.

14. The apparatus of claim 12, wherein the apparatus is further caused, at least in part to perform one of:
transition the display from an area of interest associated with a lower display priority to an area of interest associated with a higher display priority; and
transition the display from an area of interest associated with a higher display priority to an area of interest associated with a lower display priority.

15. The apparatus of claim 12, wherein the apparatus is further caused, at least in part to:
compute distances from the each area of interest to remaining areas of interest from among the two or more areas of interest;
compare the computed distances with a predetermined distance measure, the predetermined distance measure computed based at least in part on an aspect ratio of the display screen configured to display the video stream; and
determine one of:
the two or more areas of interest are capable of being simultaneously presented in the single view on the display screen if the computed distances are less than or equal to the predetermined distance measure; and
the two or more areas of interest are not capable of being simultaneously presented in the single view on the display screen if the computed distances are greater than the predetermined distance measure.

16. The apparatus of claim 12, wherein the predefined pace of display transition is configured to afford to a viewer of the display screen, a gradual display experience from the one area of interest to the another area of interest, and, wherein the predefined pace of display transition is configured to be adjusted to a rate of motion activity or sound activity associated with the one or more active objects within the two or more areas of interest.

17. A computer-readable storage device, the computer-readable storage device comprising a set of instructions, which, when executed by one or more processors, cause an apparatus to at least perform:
capture a video stream of a video by at least one camera using an image-capture field of view of at least 180 degrees;
identify two or more areas of interest in the video stream comprising at least one image frame from among the series of image frames of the video stream, the two or more areas of interest identified based at least in part on one or more active objects detected in the video stream;
determine a display priority for each area of interest from among the two or more areas of interest based on predefined rules for assigning the display priority to the each area of interest based on an at least one of sound, motion, object posture or change of scene in the each area of interest;
determine whether the display priority for the each area of interest is equal or not by comparing the display priority assigned to the each area of interest;
in response to determining the display priority for the each area of interest to be equal, determine whether the two or more areas of interest are capable of being simultaneously presented in a single view on a display screen, and, perform:
  facilitate display of concurrently occurring portions of the video stream related to the two or more areas of interest in the single view on the display screen if the two or more areas of interest are capable of being simultaneously presented in the single view on the display screen; and
  facilitate display of the concurrently occurring portions of the video stream related to the two or more areas of interest using a split screen arrangement on the display screen if the two or more areas of interest are not capable of being simultaneously presented in the single view on the display screen; and in response to determining the display priority for the each area of interest to be unequal, facilitate display of portions of the video stream related to one or more areas of interest from among the two or more areas of interest on the display screen based on an order of the display priority for the each area of interest, wherein the display on the display screen is transitioned based on a change detected in the display priority of at least one area of interest from among the two or more areas of interest, the display transitioned using a pre-defined pace of display transition.

18. The computer-readable storage device of claim 17, wherein the apparatus is further caused, at least in part to:

compute distances from the each area of interest to remaining areas of interest from among the two or more areas of interest;

compare the computed distances with a predetermined distance measure, the predetermined distance measure computed based at least in part on an aspect ratio of the display screen configured to display the video stream; and determine one of:

the two or more areas of interest are capable of being simultaneously presented in the single view on the display screen if the computed distances are less than or equal to the predetermined distance measure; and the two or more areas of interest are not capable of being simultaneously presented in the single view on the display screen if the computed distances are greater than the predetermined distance measure.

19. The computer-readable storage device of claim 17 wherein the display is transitioned from an area of interest associated with a lower display priority to an area of interest associated with a higher display priority.

20. The computer-readable storage device of claim 17 wherein the display is transitioned from an area of interest associated with a higher display priority to an area of interest associated with a lower display priority.

* * * * *